US011068401B2

(12) United States Patent
Du et al.

(10) Patent No.: US 11,068,401 B2
(45) Date of Patent: Jul. 20, 2021

(54) METHOD AND APPARATUS TO IMPROVE SHARED MEMORY EFFICIENCY

(71) Applicant: Intel Corporation, Santa Clara, CA (US)

(72) Inventors: Jianghong Du, Shanghai (CN); Yong Jiang, Shanghai (CN); Lei Shen, Shanghai (CN); Yuanyuan Li, Shanghai (CN); Ruijia Li, Shanghai (CN); Lingyi Kong, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/757,727

(22) PCT Filed: Sep. 25, 2015

(86) PCT No.: PCT/CN2015/090741
§ 371 (c)(1),
(2) Date: Mar. 6, 2018

(87) PCT Pub. No.: WO2017/049592
PCT Pub. Date: Mar. 30, 2017

(65) Prior Publication Data
US 2019/0042412 A1 Feb. 7, 2019

(51) Int. Cl.
G06F 12/084 (2016.01)
(52) U.S. Cl.
CPC .... G06F 12/084 (2013.01); G06F 2212/1044 (2013.01)

(58) Field of Classification Search
CPC .......... G06F 12/084; G06F 2212/1044; G06F 8/443; G06F 8/41; G06F 8/44; G06F 8/447
See application file for complete search history.

(56) References Cited

U.S. PATENT DOCUMENTS 6,684,298 B1   1/2004  Dwarkadas et al.
7,023,437 B1   4/2006  Voorhies et al.
(Continued)

FOREIGN PATENT DOCUMENTS

CN     101313286 A    11/2008
CN     101504618 A     8/2009
(Continued)

OTHER PUBLICATIONS

International Preliminary Report on Patentability received for International Application No. PCT/CN2015/090741, dated Apr. 5, 2018, 5 pages.
(Continued)

Primary Examiner — David Yi
Assistant Examiner — Tahilba O Puche
(74) Attorney, Agent, or Firm — Spectrum IP Law Group LLC

(57) ABSTRACT

Methods and apparatus to improve shared memory efficiency are described. In an embodiment, a first version of a code to access one or more registers as shared local memory is compiled. A second version of the same code is also compiled to access a cache as the shared local memory. The first version of the code is executed in response to comparison of a work group size of the code with a threshold value. Other embodiments are also disclosed and claimed.

25 Claims, 18 Drawing Sheets

(56) References Cited

U.S. PATENT DOCUMENTS

| | | | |
|---|---|---|---|
| 7,268,785 B1* | 9/2007 | Glanville | G06T 1/20 345/506 |
| 7,512,936 B2* | 3/2009 | Schneider | G06F 21/14 717/136 |
| 7,694,075 B1 | 4/2010 | Feekes, Jr. | |
| 8,984,311 B2 | 3/2015 | Moses et al. | |
| 10,178,619 B1 | 1/2019 | Samson et al. | |
| 2002/0196252 A1 | 12/2002 | Liao et al. | |
| 2003/0038803 A1 | 2/2003 | Morein et al. | |
| 2005/0050373 A1 | 3/2005 | Orenstien et al. | |
| 2005/0080994 A1 | 4/2005 | Cohen et al. | |
| 2006/0070044 A1* | 3/2006 | Romanovski | G06F 9/449 717/136 |
| 2006/0206686 A1 | 9/2006 | Banerjee et al. | |
| 2007/0094525 A1 | 4/2007 | Uguen et al. | |
| 2007/0150657 A1 | 6/2007 | Theodros et al. | |
| 2010/0122264 A1* | 5/2010 | Xiaocheng | G06F 12/1063 719/312 |
| 2010/0138571 A1 | 6/2010 | Cain et al. | |
| 2010/0166065 A1 | 7/2010 | Perlman et al. | |
| 2010/0275049 A1 | 10/2010 | Balakrishnan et al. | |
| 2011/0264812 A1 | 10/2011 | Bergman et al. | |
| 2011/0283124 A1 | 11/2011 | Branover et al. | |
| 2011/0307739 A1* | 12/2011 | El Mahdy | G06F 11/261 714/28 |
| 2011/0314314 A1 | 12/2011 | Sengupta | |
| 2012/0159074 A1 | 6/2012 | Sodhi et al. | |
| 2012/0284543 A1 | 11/2012 | Xian et al. | |
| 2013/0111121 A1 | 5/2013 | Ananthakrishnan et al. | |
| 2014/0053009 A1 | 2/2014 | Semin | |
| 2014/0098113 A1 | 4/2014 | Sabony | |
| 2014/0118347 A1 | 5/2014 | Hakura et al. | |
| 2014/0149677 A1* | 5/2014 | Jayasena | G06F 9/52 711/137 |
| 2014/0173206 A1 | 6/2014 | Wang et al. | |
| 2014/0181553 A1 | 6/2014 | Eckert et al. | |
| 2014/0333619 A1 | 11/2014 | Morphet et al. | |
| 2014/0380289 A1* | 12/2014 | Kalogeropulos | G06F 8/4441 717/152 |
| 2015/0046143 A1 | 2/2015 | Huang et al. | |
| 2016/0011975 A1 | 1/2016 | Ananthakrishnan et al. | |
| 2016/0062947 A1 | 3/2016 | Chetlur et al. | |
| 2016/0077575 A1 | 3/2016 | Paul et al. | |
| 2016/0086340 A1 | 3/2016 | Woo et al. | |
| 2016/0092363 A1 | 3/2016 | Wang et al. | |
| 2016/0098856 A1 | 4/2016 | Broadhurst et al. | |
| 2016/0217608 A1 | 7/2016 | Howson | |
| 2016/0335020 A1 | 11/2016 | Sodhi et al. | |
| 2016/0373818 A1 | 12/2016 | Fitzpatrick et al. | |
| 2017/0300418 A1 | 10/2017 | Reed et al. | |
| 2017/0322617 A1 | 11/2017 | Maiyuran et al. | |
| 2018/0046581 A1 | 2/2018 | Banerjee et al. | |
| 2020/0260380 A1 | 8/2020 | Samson et al. | |

FOREIGN PATENT DOCUMENTS

| | | |
|---|---|---|
| CN | 104011703 A | 8/2014 |
| WO | 2017/049592 A1 | 3/2017 |

OTHER PUBLICATIONS

International Search Report and Written Opinion received for International Application No. PCT/CN2015/090741, dated Jul. 1, 2016, 11 pages.

Bhatia et al., "Sequential Prefetch Cache Sizing for Maximal Hit Rate,", ACM International Symposium on Modeling, Analysis and Simulation of Computer and Telecommunication Systems, 18th Year IEEE 2010.

Chakraborty et al., "Static Energy Reduction by Performance Linked Dynamic Cache Resizing", Department of Computer Science and Engineering, IIT Guwahati, Assam, India—781039, IEEE 2016.

Extended European Search Report received for European Patent Application No. 1819606.5, dated Oct. 2, 2018, 7 pages.

Final office action dated Apr. 16, 2019, to U.S. Appl. No. 15/488,637.

Goodfellow, et al. "Adaptive Computation and Machine Learning Series", Book, Nov. 18, 2016, pp. 98-165, Chapter 5, The MIT Press, Cambridge, MA.

Lindholm, et al, "NVIDIA Tesla: A Unified Graphics and Computing Architecture," journal, Mar.-Apr. 2008, pp. 39-55, 0272-1732/08, IEEE Computer Society, Washington D.C.

Nicholas Wilt, "The CUDA Handbook; A Comprehensive Guide to GPU Programming", Book, Jun. 22, 2013, pp. 41-57, Addison-Wesley Professional, Boston, MA.

Non-final office action dated Dec. 31, 2019, to U.S. Appl. No. 15/488,637.

Non-final office action dated Oct. 18, 2018, to U.S. Appl. No. 15/488,637.

Nvidia, "Nvidia Turing GPU Architecture; Graphics Reinvented," Whitepaper, 2018, 86 pages, WP-09183-001_v01, Nvidia, Santa Clara, CA.

Ross, et al. "Intel Processor Graphics: Architecture & Programming", Power Point Presentation, Aug. 2015, 78 pages, Intel Corporation, Santa Clara, CA.

Shane Cook, "CUDA Programming; A Developer's Guide to Parallel Computing with GPUs," book, 2013, 591 pages, ISBN: 978-0-12-415933-4, Morgan Kaufmann, Waltham, MA.

Shane Cook, "CUDA Programming", Book, 2013, pp. 37-52, Chapter 3, Elsevier Inc., Amsterdam Netherlands.

Stephen Junking, "The Compute Architecture of Intel Processor Graphics Gen9", paper, Aug. 14, 2015, 22 pages, Version 1.0, Intel Corporation, Santa Clara, CA.

Final Office Action dated Jul. 8, 2020, to U.S. Appl. No. 15/488,637.

International Search Report and Written Opinion received for International Application No. PCT/US2018/043685, dated Oct. 30, 2018, 12 pages.

Non-final office action dated Jul. 8, 2019 to U.S. Appl. No. 16/243,029.

Nicholas Wilt, "The CUDA Handbook: A Comprehensive Guide to GPU Programming," Jun. 10, 2013, 7 pages, ISBN 0134852745, Pearson Education, New York, NY.

Non-final office action dated Apr. 2, 2018, to U.S. Appl. No. 15/477,049.

* cited by examiner

```
ShuffleKernel( const __global float *input, __global float *output)
{
  int gidx = get_global_id(0);
  size_t group_id=get_group_id(0);
  size_t item_id=get_local_id(0);
  float result=0;
  float in = input[gidx];

for (int i = 0; i < 4; i++)
  {
   result += intel_sub_group_shuffle(in, (item_id+i)%GROUP_SIZE);
  }
      result *= mask[group_id%4];
      output[gidx]= result;
}
```

FIG. 4

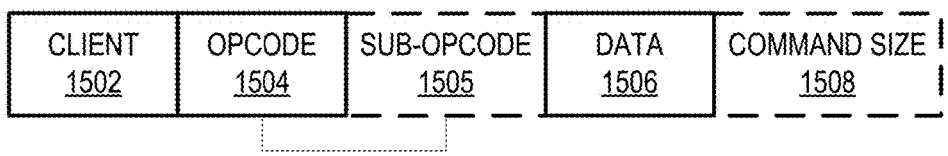
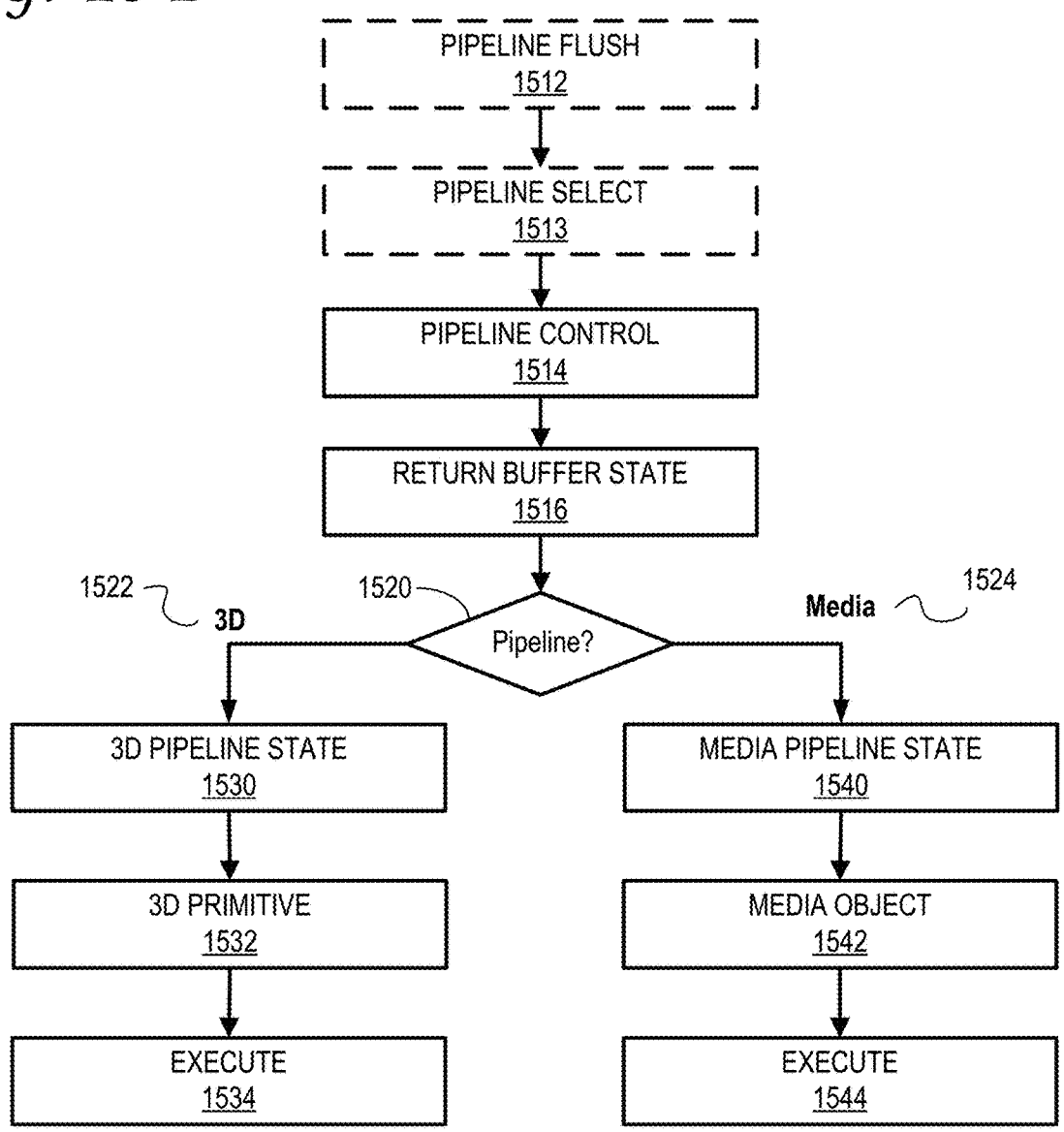

METHOD AND APPARATUS TO IMPROVE SHARED MEMORY EFFICIENCY

RELATED APPLICATIONS

This application claims priority under 35 U.S.C. § 371 to International Application No. PCT/CN2015/090741 filed Sep. 25, 2015, entitled METHOD AND APPARATUS TO IMPROVE SHARED MEMORY EFFICIENCY. The entire disclosure(s) of these documents are incorporated by reference herein for all purposes.

FIELD

The present disclosure generally relates to the field of electronics. More particularly, an embodiment relates to techniques for improving shared memory efficiency.

BACKGROUND

OpenCL (Open Computing Language) is an open, royalty-free standard for general-purpose parallel programming of heterogeneous systems. OpenCL provides a uniform programming environment for software developers to write efficient, portable code for high-performance compute servers, desktop computer systems, and handheld devices using a diverse mixture of multi-core CPUs (Central Processing Units), GPUs (Graphics Processing Units), Cell-type architectures and other parallel processors such as DSPs (Digital Signal Processors). The standard is developed by the Khronos Group.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 3 and 4 illustrate sample pseudocode to illustrate performance of the kernel according to some embodiments.

FIGS. 15A and 15B illustrate graphics processor command format and sequence, respectively, according to some embodiments.

DETAILED DESCRIPTION

Figure 1:
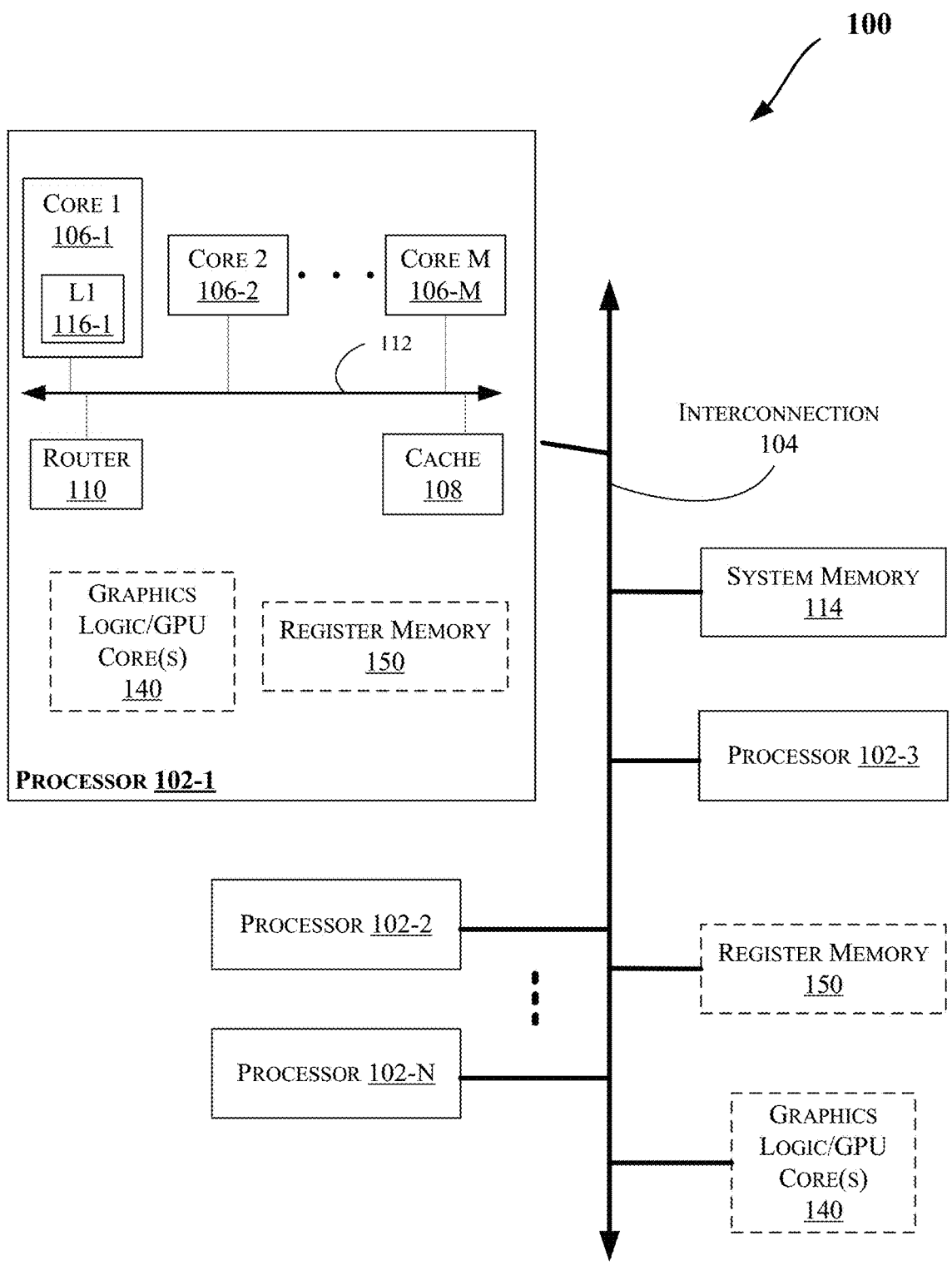
FIGS. 1, 6-7, 16, and 18 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As discussed herein, an OpenCL device has one or more compute units. A work group (which generally refers to a collection of related work items) executes on a single compute unit. A work item refers to one of a collection of parallel executions of a kernel invoked on a device by a command. And, a compute unit is composed of one or more processing elements and local memory. Generally, in OpenCL (and other similar heterogeneous computing framework), the local memory is usually implemented as a portion of cache, which can be dedicated to a compute unit as shared local memory. The shared local memory is generally used for storage of data that is dedicated to one and only one work group (in OpenCL context). In some cases, local memory may be implemented as a portion of Dynamic Random Access Memory (or DRAM, e.g., when used by or coupled to a Central Processing Unit (CPU)), on-chip memory (such as FPGA (Field-Programmable Gate Array)), dedicated on-device shared memory (e.g., utilizing Compute Unified Device Architecture (CUDA)), or cache (e.g., incorporated with a GPU and/or a CPU).

Furthermore, some graphics processors may provide relatively big register files (also referred to herein as register memory) per hardware thread (such as 4K bytes per hardware thread). As discussed herein, a register file generally refers to an array of processor registers in a Central Processing Unit (CPU) or a Graphics Processing Unit (GPU). Register files may be implemented with hardware registers and/or fast static RAMs (Random Access Memory) with multiple ports. Access to the registers can be significantly faster than access to cache, but those direct-accessed registers are not fully utilized if most of the memory is using shared local memory in cache. Sometimes if the Work Group (WG) size is not very big (for example, where the WG size is 8), or the shared local memory size is not very big, the cache based shared local memory can actually be replaced by register based shared memory for computation (which may also be referred to as private memory). Utilizing register based memory in turn improves shared memory access (i.e., reading/writing) performance significantly.

To this end, some embodiments provide techniques for improving shared memory efficiency. One embodiment utilizes a new framework to improve accessing (reading and/or writing) Shared Local Memory (SLM) efficiency used by a graphics processor (such as graphics logic 140 of FIG. 1). Two kinds of executable binary codes may be compiled during the compilation phase, where one executable code implements the shared local memory in register memory, and the other executable code implements the shared local memory in cache (e.g., level 3 (L3) cache in at least one computing platform). The runtime code then chooses which binary executable code(s) (or application(s)) to launch for execution by a computing device (e.g., including graphics logic, such as logic 140 of FIG. 1).

Further, some embodiments may be applied in computing systems that include one or more processors (e.g., with one or more processor cores), such as those discussed with reference to FIGS. 1-10, including for example mobile computing devices, e.g., a smartphone, tablet, UMPC (Ultra- Mobile Personal Computer), laptop computer, Ultrabook™ computing device, smart watch, smart glasses, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may include general-purpose CPUs and/or GPUs in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single Integrated Circuit (IC) chip. Moreover, the chip may include one or more shared and/or private caches (such as cache 108), buses or interconnections (such as a bus or interconnection 112), graphics and/or memory controllers (such as those discussed with reference to FIGS. 6-10), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache, a level 3 (L3) cache, etc. Moreover, various components of the processor 102-1 may communicate with the cache 108 directly, through a bus (e.g., the bus 112), and/or a memory controller or hub.

As shown in FIG. 1, the processor 102 may further include graphics logic 140 (e.g., which may include one or more Graphics Processing Unit (GPU) core(s) such as those discussed with reference to FIGS. 6-10) to perform various graphics and/or general purpose computation(s) related operations such as discussed herein. Logic 140 may have access to one or more storage devices discussed herein cache 108, L1 cache 116, memory 114, register memory 150 (which may include one or more registers or register file(s) configured as shared local memory such as discussed herein with reference to various embodiments), or another memory in system 100) to store information relating to operations of the logic 140, such as information communicated with various components of system 100 as discussed herein. Also, while logic 140 and register memory 150 are shown inside the processor 102 (or coupled to interconnection 104), they may be located elsewhere in the system 100 in various embodiments. For example, logic 140 may replace one of the cores 106, may be coupled directly to interconnection 112, etc. Also, register memory 150 may be directly coupled to interconnection 112, etc.

As discussed above, one embodiment utilizes a new framework to improve accessing (reading and/or writing) Shared Local Memory (SLM) efficiency used by a graphics processor (such as graphics logic 140). Two kinds of executable binary codes are compiled during the compilation phase, where one executable is to implement the shared local memory in register memory, and the other executable is to implement the shared local memory in cache (e.g., level 3 (L3) cache in at least one computing platform). The runtime code is then responsible for choosing which executable binary code(s) or application(s) to launch for execution by a computing device.

For example, when an application executes, if the WG size is less than the number that the register (or private memory) can afford (e.g., 8), then it will execute the binary code compiled with shared local memory implemented in register(s), otherwise the other binary code is executed with shared local memory implemented in (e.g., L3) cache. With this new framework if the used memory size for the set work group size is less than the size that the register (or private memory) can afford, the shared local memory accessing efficiency is improved significantly.

By contrast, one current solution would be implement the shared memory as a portion of cache, and no matter how big the WG size is, the cache will be used as shared memory. In some cases, if the shared memory is frequently used (such as matrix multiplication), the computing performance can be lacking. Hence, such implementations will benefit more from the proposed embodiments.

Moreover, another potential solution would be to share data in register(s) is an OpenCL extension. This would support data sharing within the same subgroup in register(s). The size of subgroup is equal to the SIMD (Single Instruction, Multiple Data) lane. For instance, when the kernel is compiled to SIMD16, the size of subgroup is also set to 16, which means data can be shared within 16 work items. The difference here is that a programmer needs to know how to leverage the subgroup to share data in registers. Such kernel code can be incompatible with other vendors' SDK (Software Development Kit) and/or platforms. Instead, an embodiment allows the compiler and/or runtime code to decide whether data can be shared in register(s), and a programmer may still write the kernel to use shared local memory. Such an approach makes the implementation compatible (and/or performs better) on various computing platforms.

Figure 2:
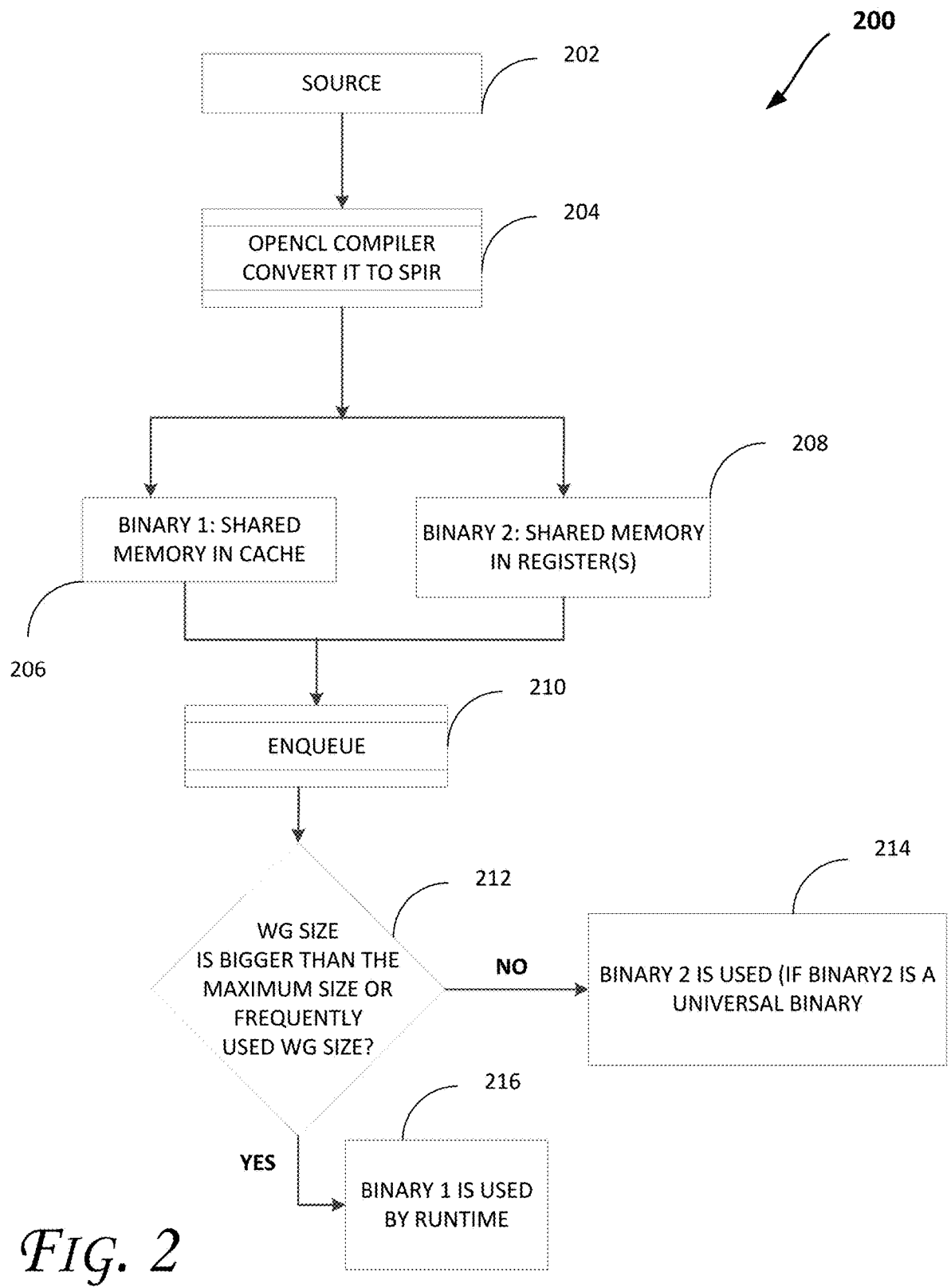
FIG. 2 illustrates a flow diagram of a method to compile and/or load executable binary code for runtime, according to an embodiment.

FIG. 2 illustrates a flow diagram of a method 200 to compile and/or load executable binary code for runtime, according to an embodiment. In one embodiment, various components discussed with reference to the other figures may be utilized to perform one or more of the operations of method 200.

Referring to FIGS. 1-2, an OpenCL compiler (e.g., stored in memory 114 (or other memory) and executed on processor 102 and/or graphics logic 140) compiles the source code 202 in accordance with Standard Portable Intermediate Representation (SPIR)) at operation 204. At operations 206 and 208, a Just In Time (JIT) compiler (e.g., stored in memory 114 (or other memory) and executed on processor 102 and/or graphics logic 140) generates two versions of executable binary code, where the first code (Binary 1) at operation 206 is the binary code with the shared local memory implemented in (e.g., L3) cache. The second code (Binary 2) generated at operation 208 is the binary code with the shared local memory implemented in register(s). At operation 208, binary 2 is generated with maximum WG size (or a universal binary) or some frequently used WG size in accordance with an embodiment.

Moreover, in some embodiments, there are two methods to generate Binary 2 at operation 208. One method is to generate a universal binary, in this binary, the allowed WG size is set as the maximum size that the register (private memory) can afford. For example, on a computing platform which supports SIMD, the allowed WG size can be computed as: Max work group size=(private memory size that can be shared within thread−required local memory size)/required private memory size of work item. Then, the maximum work group size will be aligned to a lower bound of SIMD width (such as 8, 16, 32, etc.). The other method to generate Binary 2 is to fix the WG size according to the frequently used WG size.

As operation 210, when the runtime code or application executes, an Enqueue process passes the size of WG. At operation 212, the runtime code/application will make the call as to which binary (i.e., Binary 1 or Binary 2) is actually used. At operation 214 Binary 2 is used, if Binary 2 is compiled as a universal binary based on the maximum WG size that the platform's register can afford. the size of actual WG may be less than the maximum size in an embodiment as discussed above, and the runtime will call a "Binary Customizer" module (e.g., stored in memory 114 (or other memory) and executed on processor 102 and/or graphics logic 140) to customize the Binary 2 according to the actual WG size. The runtime code will then launch the customized binary to target the computing device executing the binary code. If the Binary 2 is compiled based on the fixed WG size, then the runtime code will directly call it. Alternatively, if the WG size is bigger (as determined at operation 212), method 200 continues at operation 216 which utilizes the Binary 1 by runtime code.

Accordingly, compared with a more traditional framework, the new framework compiles two versions of binary executable code: one is based on shared memory using one or more register(s), while the other one is based on the shared local memory using some hardware cache. During the running time, runtime code (or a software application) will decide which code version to use based on the WG size and/or hardware/platform capability.

Figure 3:

FIGS. 3 and 4 illustrate sample pseudocode to illustrate performance of the kernel according to some embodiments. More particularly, SLMKernel uses the traditional technique (i.e., shared local memory implemented in SLM). ShuffleKernel (e.g., utilizing cl_intel_sub_group) measures the kernel's performance of shared local memory in register. Both kernels are compiled to SIMD16, thus WG size is set as 16.

Referring to FIGS. 3 and 4, a global buffer is first split into segments of GROUP_SIZE (16 in this case) elements, then for each segment, for each element, four elements are summed up starting from it (i.e., a wrap back to beginning when end of segment is hit). Then, based on the remainder of group identifier (ID) divide by four. If the remainder is 1, multiply those sums by −1; if remainder is 2, multiply by 2, if remainder is 3, multiply by −2, or if remainder is 0, keep with no change. Then, those updated sum values are written back to the output buffer. As previously indicated, the operations discussed with reference to FIGS. 3 and 4 are for performance demonstration purposes.

Figure 5:
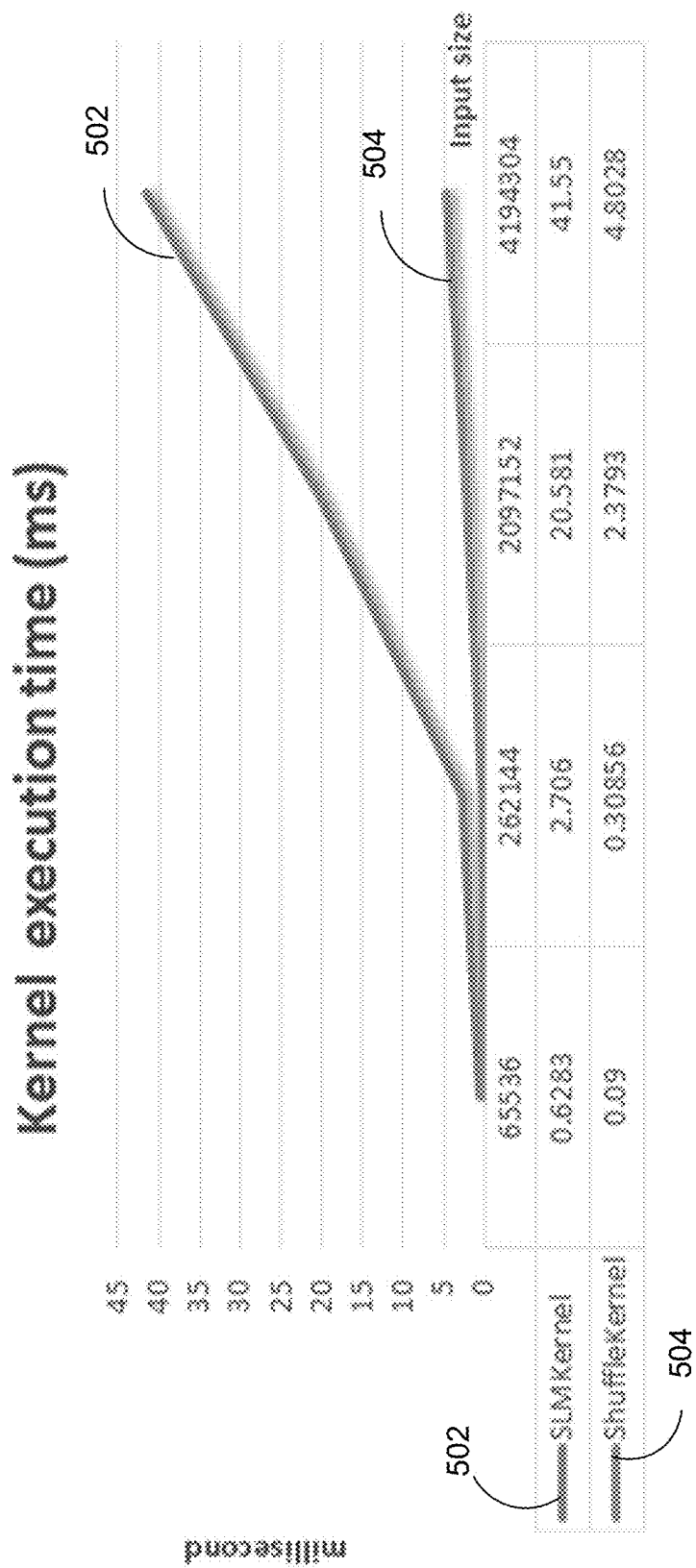
FIG. 5 shows a sample performance data regarding kernel execution time, according to some embodiments.

FIG. 5 shows a sample performance data regarding kernel execution time, according to some embodiments. For example, FIG. 5 shows sample performance data for different input size. For this kind of calculation, ShuffleKernel 502 is about ten times faster than SLMKernel 504 as shown in FIG. 5.

Figure 6:
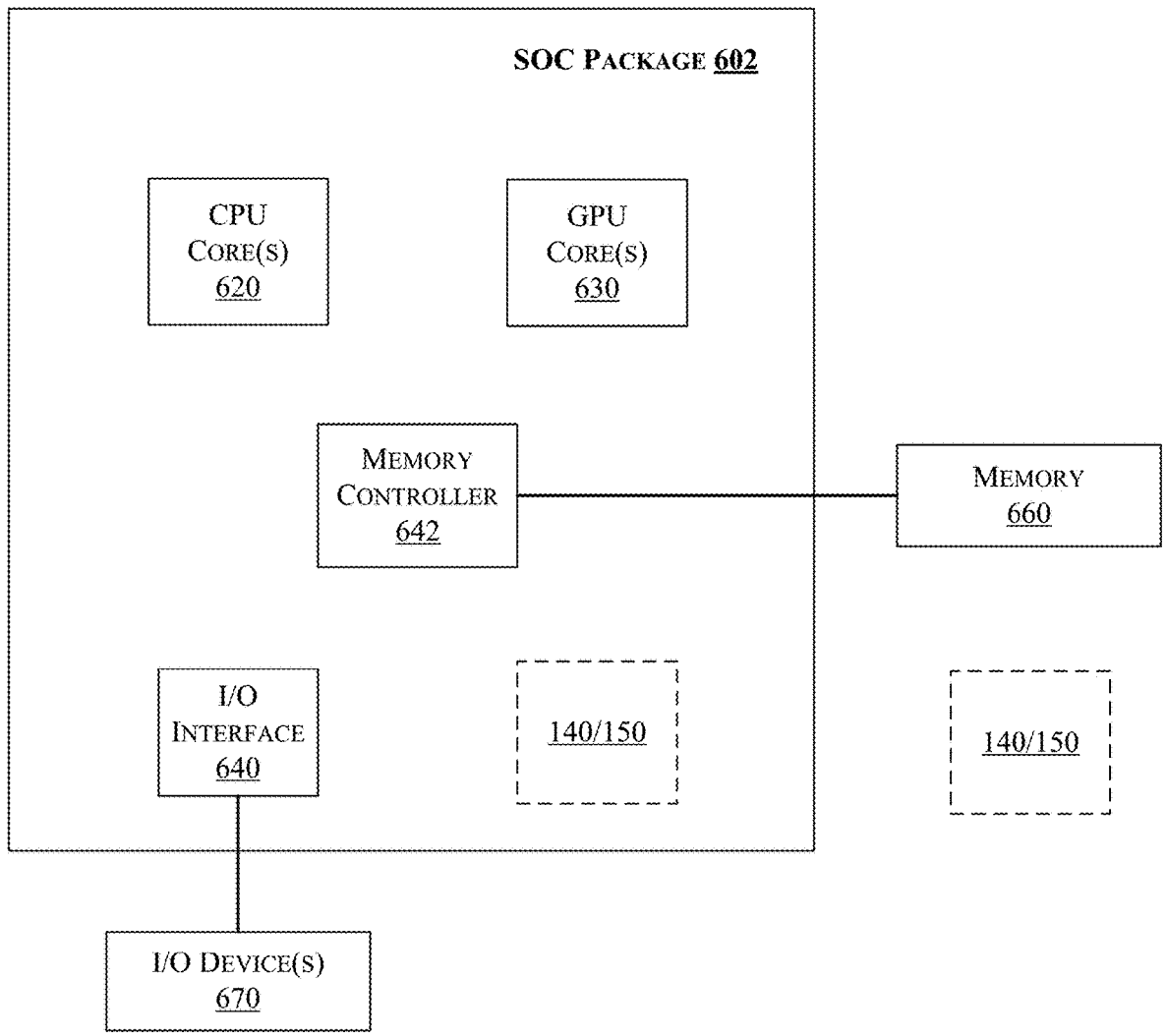

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620 (which may be the same as or similar to the cores 106 of FIG. 1), one or more Graphics Processor Unit (GPU) cores 630 (which may be the same as or similar to the graphics logic 140 of FIG. 1), an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures such as system memory 114 of FIG. 1) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display, an image/video capture device (such as a camera or camcorder/video recorder), a touch screen, a speaker, or the like. Furthermore, SOC package 602 may include/integrate the logic 140 and/or register memory 150 (or a portion of the register memory 150) in an embodiment. Alternatively, the logic 140 and/or register memory 150 (or a portion of the register memory 150) may be provided outside of the SOC package 602 (i.e., as a discrete logic).

Figure 7:
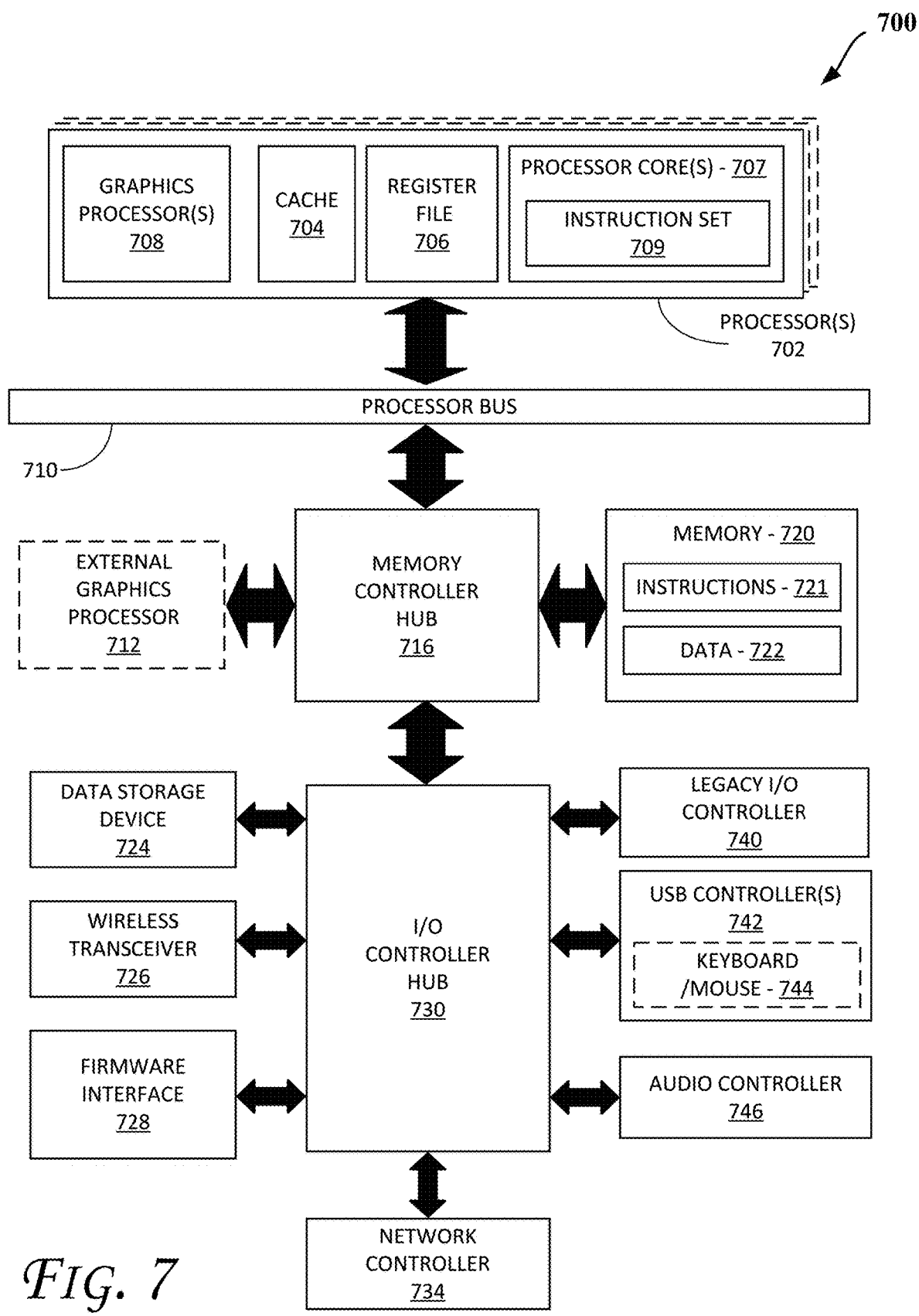

FIG. 7 is a block diagram of a processing system 700, according to an embodiment. In various embodiments the system 700 includes one or more processors 702 and one or more graphics processors 708 (such as the graphics logic 140 of FIG. 1), and may be a single processor desktop system, a multiprocessor workstation system, or a server system having a large number of processors 702 (such as processor 102 of FIG. 1) or processor cores 707 (such as cores 106 of FIG. 1). In on embodiment, the system 700 is a processing platform incorporated within a system-on-a-chip (SoC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 (e.g., such as register memory 150 of FIG. 1) is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit communication signals such as address, data, or control signals between processor 702 and other components in system 700. In one embodiment the system 700 uses an exemplary 'hub' system architecture, including a memory controller hub 716 and an Input Output (I/O) controller hub 730. A memory controller hub 716 facilitates communication between a memory device and other components of system 700, while an I/O Controller Hub (ICH) 730 provides connections to I/O devices via a local I/O bus. In one embodiment, the logic of the memory controller hub 716 is integrated within the processor.

Memory device 720 can be a dynamic random access memory (DRAM) device, a static random access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations.

In some embodiments, ICH 730 enables peripherals to connect to memory device 720 and processor 702 via a high-speed I/O bus. The I/O peripherals include, but are not limited to, an audio controller 746, a firmware interface 728, a wireless transceiver 726 (e.g., Wi-Fi, Bluetooth), a data storage device 724 (e.g., hard disk drive, flash memory, etc.), and a legacy I/O controller 740 for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710. It will be appreciated that the system 700 shown is exemplary and not limiting, as other types of data processing systems that are differently configured may also be used. For example, the I/O controller hub 730 may be integrated within the one or more processor 702, or the memory controller hub 716 and I/O controller hub 730 may be integrated into a discreet external graphics processor, such as the external graphics processor 712.

Figure 8:
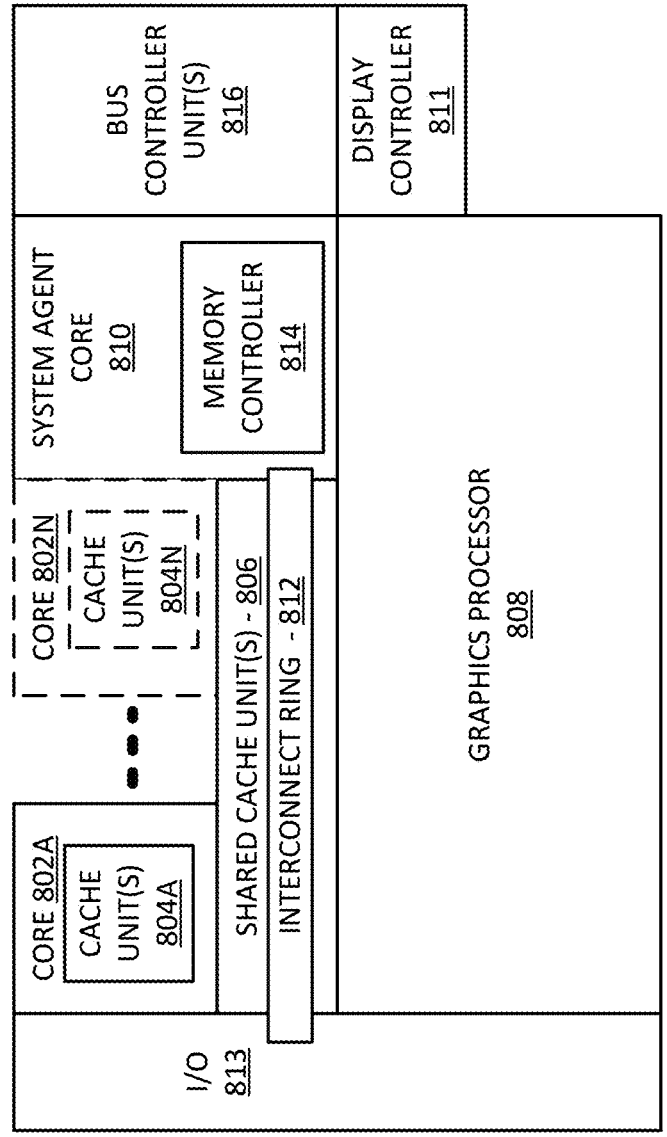
FIGS. 8-12 and 14 illustrate various components of processors in accordance with some embodiments.

FIG. 8 is a block diagram of an embodiment of a processor 800 having one or more processor cores 802A-802N, an integrated memory controller 814, and an integrated graphics processor 808. The processor 800 may be similar to or the same as the processor 102 discussed with reference to FIG. 1. Those elements of FIG. 8 having the same reference numbers (or names) as the elements of any other figure herein can operate or function in any manner similar to that described elsewhere herein, but are not limited to such. Processor 800 can include additional cores up to and including additional core 802N represented by the dashed lined boxes. Each of processor cores 802A-802N includes one or more internal cache units 804A-804N. In some embodiments each processor core also has access to one or more shared cached units 806.

The internal cache units 804A-804N and shared cache units 806 represent a cache memory hierarchy within the processor 800. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 806 and 804A-804N.

In some embodiments, processor 800 may also include a set of one or more bus controller units 816 and a system agent core 810. The one or more bus controller units 816 manage a set of peripheral buses, such as one or more Peripheral Component Interconnect buses (e.g., PCI, PCI Express). System agent core 810 provides management functionality for the various processor components. In some embodiments, system agent core 810 includes one or more integrated memory controllers 814 to manage access to various external memory devices (not shown).

In some embodiments, one or more of the processor cores 802A-802N include support for simultaneous multi-threading. In such embodiment, the system agent core 810 includes components for coordinating and operating cores 802A-802N during multi-threaded processing. System agent core 810 may additionally include a power control unit (PCU), which includes logic and components to regulate the power state of processor cores 802A-802N and graphics processor 808.

In some embodiments, processor 800 additionally includes graphics processor 808 to execute graphics processing operations. In some embodiments, the graphics processor 808 couples with the set of shared cache units 806, and the system agent core 810, including the one or more integrated memory controllers 814. In some embodiments, a display controller 811 is coupled with the graphics processor 808 to drive graphics processor output to one or more coupled displays. In some embodiments, display controller 811 may be a separate module coupled with the graphics processor via at least one interconnect, or may be integrated within the graphics processor 808 or system agent core 810.

In some embodiments, a ring based interconnect unit 812 is used to couple the internal components of the processor 800. However, an alternative interconnect unit may be used, such as a point-to-point interconnect, a switched interconnect, or other techniques, including techniques well known in the art. In some embodiments, graphics processor 808 couples with the ring interconnect 812 via an I/O link 813.

The exemplary I/O link 813 represents at least one of multiple varieties of I/O interconnects, including an on package I/O interconnect which facilitates communication between various processor components and a high-performance embedded memory module 818, such as an eDRAM (or embedded DRAM) module. In some embodiments, each of the processor cores 802-802N and graphics processor 808 use embedded memory modules 818 as a shared Last Level Cache.

In some embodiments, processor cores 802A-802N are homogenous cores executing the same instruction set architecture. In another embodiment, processor cores 802A-802N are heterogeneous in terms of instruction set architecture (ISA), where one or more of processor cores 802A-802N execute a first instruction set, while at least one of the other cores executes a subset of the first instruction set or a different instruction set. In one embodiment processor cores 802A-802N are heterogeneous in terms of microarchitecture, where one or more cores having a relatively higher power consumption couple with one or more power cores having a lower power consumption. Additionally, processor 800 can be implemented on one or more chips or as an SoC integrated circuit having the illustrated components, in addition to other components.

Figure 9:
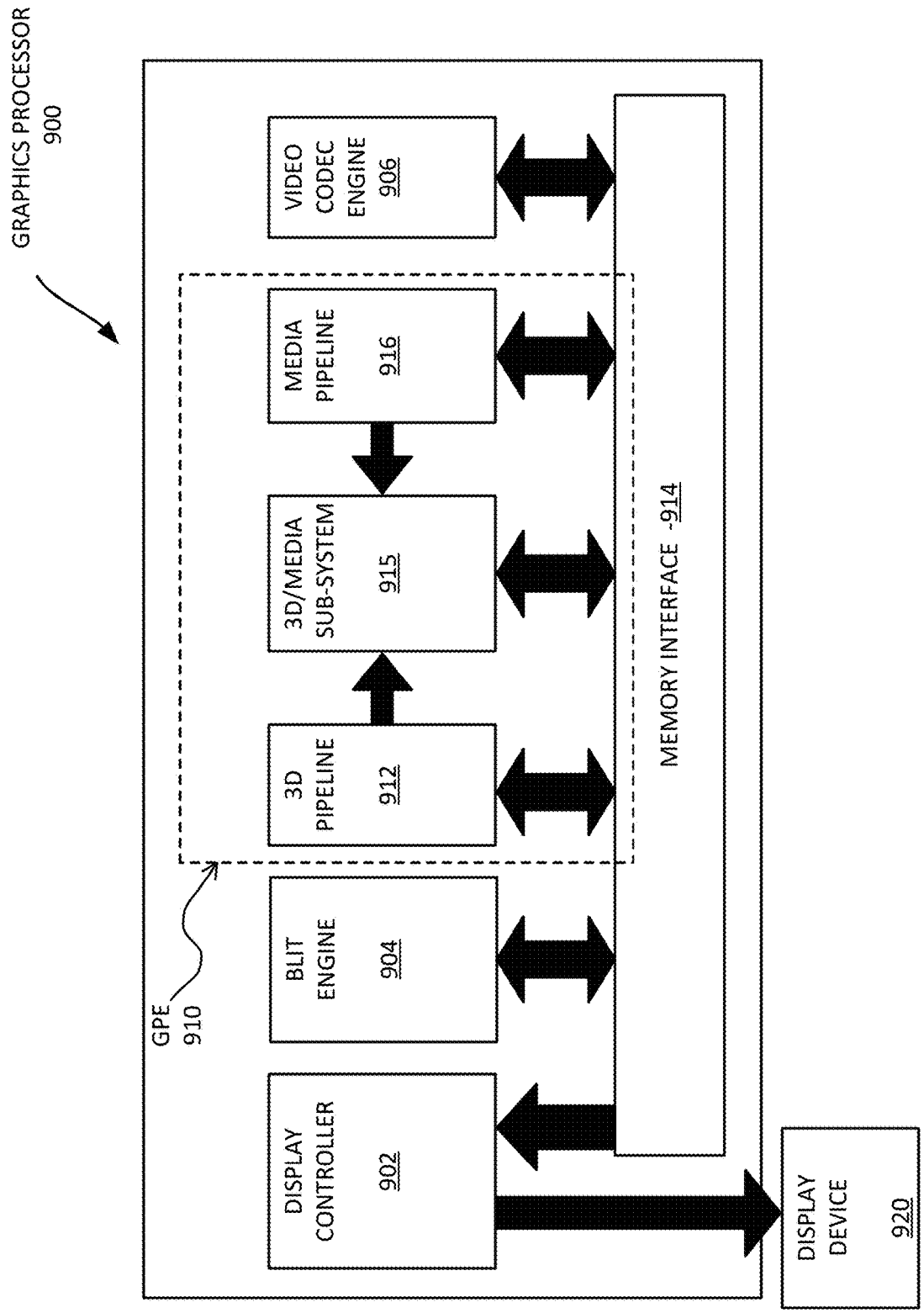

FIG. 9 is a block diagram of a graphics processor 900, which may be a discrete graphics processing unit, or may be a graphics processor integrated with a plurality of processing cores. The graphics processor 900 may be similar to or the same as the graphics logic 140 discussed with reference to FIG. 1. In some embodiments, the graphics processor communicates via a memory mapped I/O interface to registers on the graphics processor and with commands placed into the processor memory. In some embodiments, graphics processor 900 includes a memory interface 914 to access memory. Memory interface 914 can be an interface to local memory, one or more internal caches, one or more shared external caches, and/or to system memory.

In some embodiments, graphics processor 900 also includes a display controller 902 to drive display output data to a display device 920. Display controller 902 includes hardware for one or more overlay planes for the display and composition of multiple layers of video or user interface elements. In some embodiments, graphics processor 900 includes a video codec engine 906 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 900 includes a block image transfer (BLIT) engine 904 to perform two-dimensional (2D) rasterizer operations including, for example, bit-boundary block transfers. However, in one embodiment, 8D graphics operations are performed using one or more components of graphics processing engine (GPE) 910. In some embodiments, graphics processing engine 910 is a compute engine for performing graphics operations, including three-dimensional (3D) graphics operations and media operations.

In some embodiments, GPE 910 includes a 3D pipeline 912 for performing 3D operations, such as rendering three-dimensional images and scenes using processing functions that act upon 3D primitive shapes (e.g., rectangle, triangle, etc.). The 3D pipeline 912 includes programmable and fixed function elements that perform various tasks within the element and/or spawn execution threads to a 3D/Media sub-system 915. While 3D pipeline 912 can be used to perform media operations, an embodiment of GPE 910 also includes a media pipeline 916 that is specifically used to perform media operations, such as video post-processing and image enhancement.

In some embodiments, media pipeline 916 includes fixed function or programmable logic units to perform one or more specialized media operations, such as video decode acceleration, video de-interlacing, and video encode acceleration in place of, or on behalf of video codec engine 906. In some embodiments, media pipeline 916 additionally includes a thread spawning unit to spawn threads for execution on 3D/Media sub-system 915. The spawned threads perform computations for the media operations on one or more graphics execution units included in 3D/Media sub-system 915.

In some embodiments, 3D/Media subsystem 915 includes logic for executing threads spawned by 3D pipeline 912 and media pipeline 916. In one embodiment, the pipelines send thread execution requests to 3D/Media subsystem 915, which includes thread dispatch logic for arbitrating and dispatching the various requests to available thread execution resources. The execution resources include an array of graphics execution units to process the 3D and media threads. In some embodiments, 3D/Media subsystem 915 includes one or more internal caches for thread instructions and data. In some embodiments, the subsystem also includes shared memory (such as discussed with reference to register memory 150 of FIG. 1), including registers and addressable memory, to share data between threads and to store output data.

Figure 10:
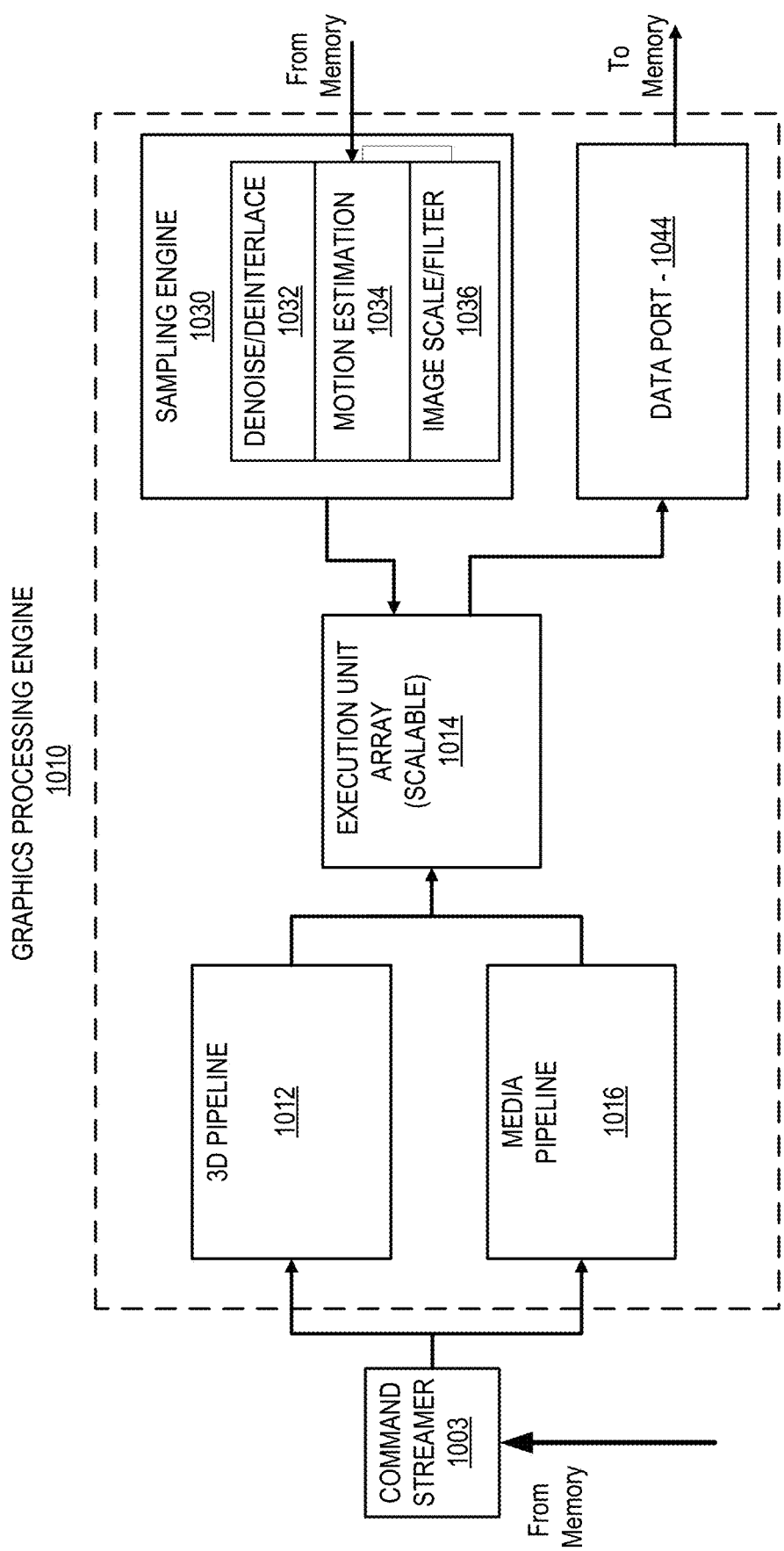

FIG. 10 is a block diagram of a graphics processing engine 1010 of a graphics processor in accordance with some embodiments. In one embodiment, the GPE 1010 is a version of the GPE 910 shown in FIG. 9. Elements of FIG. 10 having the same reference numbers (or names) as the elements of any other figure herein can operate or function in any manner similar to that described elsewhere herein, but are not limited to such.

In some embodiments, GPE 1010 couples with a command streamer 1003, which provides a command stream to the GPE 3D and media pipelines 1012, 1016. In some embodiments, command streamer 1003 is coupled to memory, which can be system memory, or one or more of internal cache memory and shared cache memory. In some embodiments, command streamer 1003 receives commands from the memory and sends the commands to 3D pipeline 1012 and/or media pipeline 1016. The commands are directives fetched from a ring buffer, which stores commands for the 3D and media pipelines 1012, 1016. In one embodiment, the ring buffer can additionally include batch command buffers storing batches of multiple commands. The 3D and media pipelines 1012, 1016 process the commands by performing operations via logic within the respective pipelines or by dispatching one or more execution threads to an execution unit array 1014. In some embodiments, execution unit array 1014 is scalable, such that the array includes a variable number of execution units based on the target power and performance level of GPE 1010.

In some embodiments, a sampling engine 1030 couples with memory (e.g., cache memory or system memory) and execution unit array 1014. In some embodiments, sampling engine 1030 provides a memory access mechanism for execution unit array 1014 that allows execution array 1014 to read graphics and media data from memory. In some embodiments, sampling engine 1030 includes logic to perform specialized image sampling operations for media.

In some embodiments, the specialized media sampling logic in sampling engine 1030 includes a de-noise/de-interlace module 1032, a motion estimation module 1034, and an image scaling and filtering module 1036. In some embodiments, de-noise/de-interlace module 1032 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 1032 includes dedicated motion detection logic (e.g., within the motion estimation engine 1034).

In some embodiments, motion estimation engine 1034 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 1034 to perform operations on video at the macro-block level that may otherwise be too computationally intensive to perform with a general-purpose processor. In some embodiments, motion estimation engine 1034 is generally available to graphics processor components to assist with video decode and processing functions that are sensitive or adaptive to the direction or magnitude of the motion within video data.

In some embodiments, image scaling and filtering module 1036 performs image-processing operations to enhance the visual quality of generated images and video. In some embodiments, scaling and filtering module 1036 processes image and video data during the sampling operation before providing the data to execution unit array 1014.

In some embodiments, the GPE 1010 includes a data port 1044, which provides an additional mechanism for graphics subsystems to access memory. In some embodiments, data port 1044 facilitates memory access for operations including render target writes, constant buffer reads, scratch memory space reads/writes, and media surface accesses. In some embodiments, data port 1044 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 1014 communicate with the data port by exchanging messages via a data distribution interconnect that couples each of the sub-systems of GPE 1010.

Figure 11:
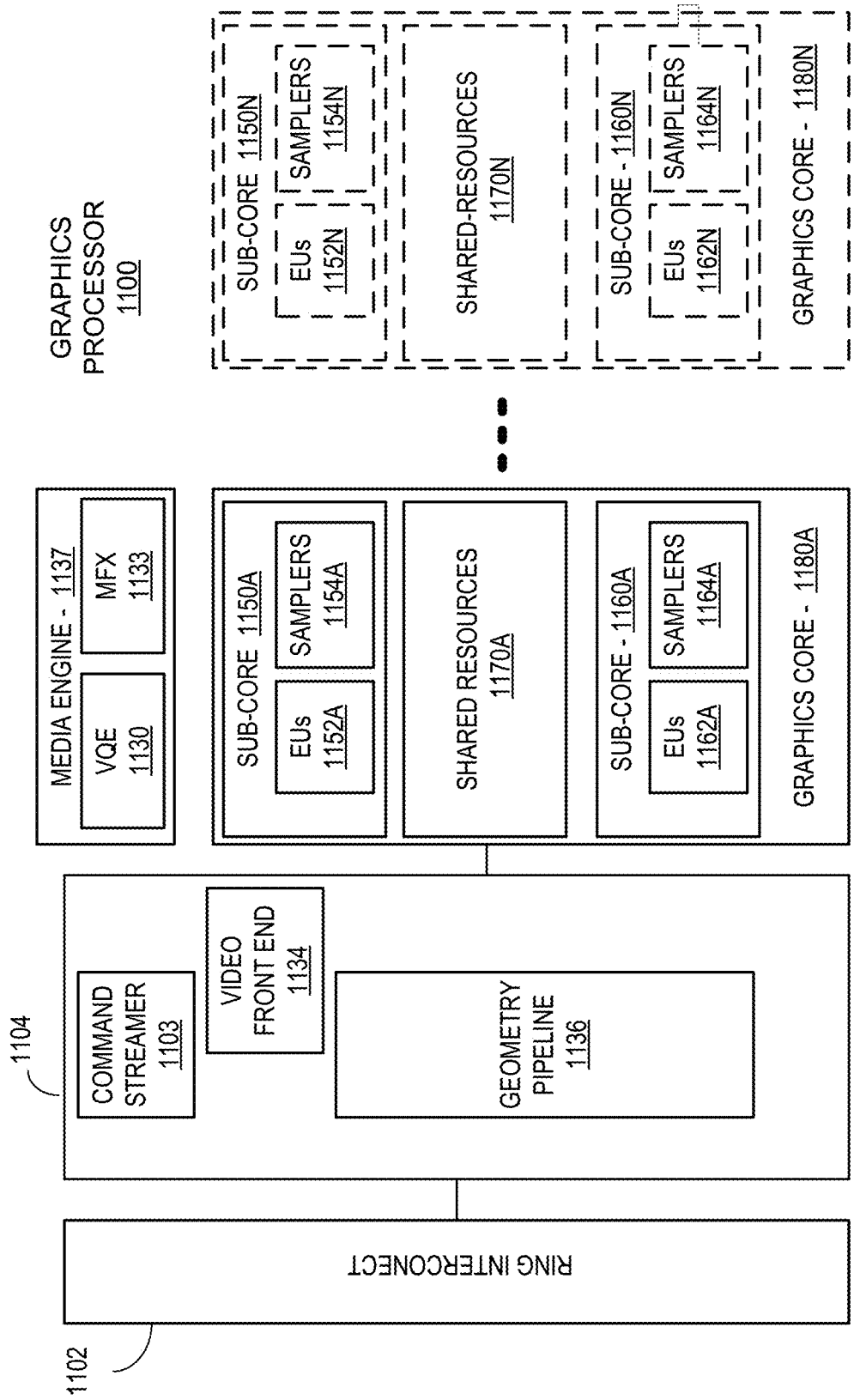

FIG. 11 is a block diagram of another embodiment of a graphics processor 1100. Elements of FIG. 11 having the same reference numbers (or names) as the elements of any other figure herein can operate or function in any manner similar to that described elsewhere herein, but are not limited to such.

In some embodiments, graphics processor 1100 includes a ring interconnect 1102, a pipeline front-end 1104, a media engine 1137, and graphics cores 1180A-1180N. In some embodiments, ring interconnect 1102 couples the graphics processor to other processing units, including other graphics processors or one or more general-purpose processor cores. In some embodiments, the graphics processor is one of many processors integrated within a multi-core processing system.

In some embodiments, graphics processor 1100 receives batches of commands via ring interconnect 1102. The incoming commands are interpreted by a command streamer 1103 in the pipeline front-end 1104. In some embodiments, graphics processor 1100 includes scalable execution logic to perform 3D geometry processing and media processing via the graphics core(s) 1180A-1180N. For 3D geometry processing commands, command streamer 1103 supplies commands to geometry pipeline 1136. For at least some media processing commands, command streamer 1103 supplies the commands to a video front end 1134, which couples with a media engine 1137. In some embodiments, media engine 1137 includes a Video Quality Engine (VQE) 1130 for video and image post-processing and a multi-format encode/decode (MFX) 1133 engine to provide hardware-accelerated media data encode and decode. In some embodiments, geometry pipeline 1136 and media engine 1137 each generate execution threads for the thread execution resources provided by at least one graphics core 1180A.

In some embodiments, graphics processor 1100 includes scalable thread execution resources featuring modular cores 1180A-1180N (sometimes referred to as core slices), each having multiple sub-cores 1150A-1150N, 1160A-1160N (sometimes referred to as core sub-slices). In some embodiments, graphics processor 1100 can have any number of graphics cores 1180A through 1180N. In some embodiments, graphics processor 1100 includes a graphics core 1180A having at least a first sub-core 1150A and a second core sub-core 1160A. In other embodiments, the graphics processor is a low power processor with a single sub-core (e.g., 1150A). In some embodiments, graphics processor 1100 includes multiple graphics cores 1180A-1180N, each including a set of first sub-cores 1150A-1150N and a set of second sub-cores 1160A-1160N. Each sub-core in the set of first sub-cores 1150A-1150N includes at least a first set of execution units 1152A-1152N and media/texture samplers 1154A-1154N. Each sub-core in the set of second sub-cores 1160A-1160N includes at least a second set of execution units 1162A-1162N and samplers 1164A-1164N. In some embodiments, each sub-core 1150A-1150N, 1160A-1160N shares a set of shared resources 1170A-1170N. In some embodiments, the shared resources include shared cache memory and pixel operation logic. Other shared resources may also be included in the various embodiments of the graphics processor.

Figure 12:
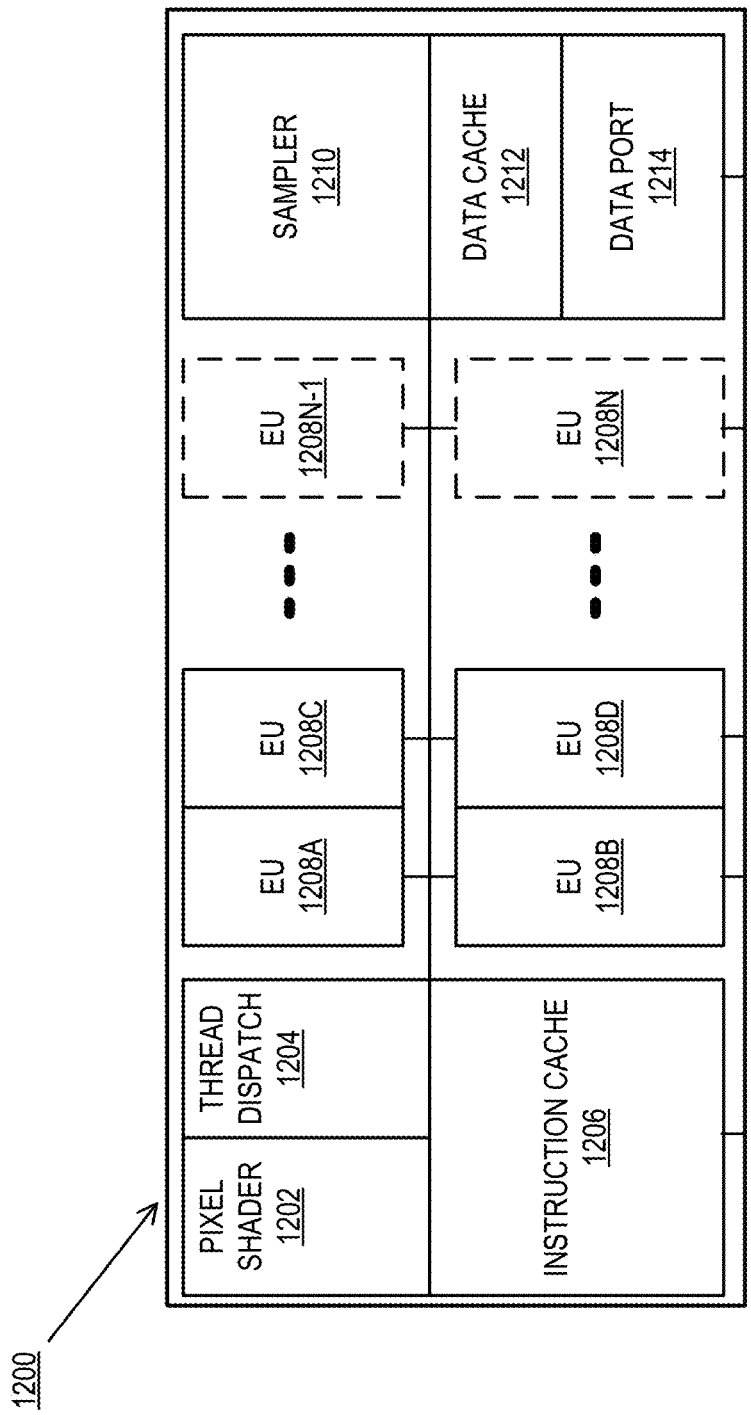

FIG. 12 illustrates thread execution logic 1200 including an array of processing elements employed in some embodiments of a GPE. Elements of FIG. 12 having the same reference numbers (or names) as the elements of any other figure herein can operate or function in any manner similar to that described elsewhere herein, but are not limited to such.

In some embodiments, thread execution logic 1200 includes a pixel shader 1202, a thread dispatcher 1204, instruction cache 1206, a scalable execution unit array including a plurality of execution units 1208A-1208N, a sampler 1210, a data cache 1212, and a data port 1214. In one embodiment the included components are interconnected via an interconnect fabric that links to each of the components. In some embodiments, thread execution logic 1200 includes one or more connections to memory, such as system memory or cache memory, through one or more of instruction cache 1206, data port 1214, sampler 1210, and execution unit array 1208A-1208N. In some embodiments, each execution unit (e.g. 1208A) is an individual vector processor capable of executing multiple simultaneous threads and processing multiple data elements in parallel for each thread. In some embodiments, execution unit array 1208A-1208N includes any number individual execution units.

In some embodiments, execution unit array 1208A-1208N is primarily used to execute "shader" programs. In some embodiments, the execution units in array 1208A-1208N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 1208A-1208N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 1208A-1208N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 1206) are included in the thread execution logic 1200 to cache thread instructions for the execution units. In some embodiments, one or more data caches (e.g., 1212) are included to cache thread data during thread execution. In some embodiments, sampler 1210 is included to provide texture sampling for 3D operations and media sampling for media operations. In some embodiments, sampler 1210 includes specialized texture or media sampling functionality to process texture or media data during the sampling process before providing the sampled data to an execution unit.

During execution, the graphics and media pipelines send thread initiation requests to thread execution logic 1200 via thread spawning and dispatch logic. In some embodiments, thread execution logic 1200 includes a local thread dispatcher 1204 that arbitrates thread initiation requests from the graphics and media pipelines and instantiates the requested threads on one or more execution units 1208A-1208N. For example, the geometry pipeline (e.g., 1136 of FIG. 11) dispatches vertex processing, tessellation, or geometry processing threads to thread execution logic 1200 (FIG. 12). In some embodiments, thread dispatcher 1204 can also process runtime thread spawning requests from the executing shader programs.

Once a group of geometric objects has been processed and rasterized into pixel data, pixel shader 1202 is invoked to further compute output information and cause results to be written to output surfaces (e.g., color buffers, depth buffers, stencil buffers, etc.). In some embodiments, pixel shader 1202 calculates the values of the various vertex attributes that are to be interpolated across the rasterized object. In some embodiments, pixel shader 1202 then executes an application programming interface (API)-supplied pixel shader program. To execute the pixel shader program, pixel shader 1202 dispatches threads to an execution unit (e.g., 1208A) via thread dispatcher 1204. In some embodiments, pixel shader 1202 uses texture sampling logic in sampler 1210 to access texture data in texture maps stored in memory. Arithmetic operations on the texture data and the input geometry data compute pixel color data for each geometric fragment, or discards one or more pixels from further processing.

In some embodiments, the data port 1214 provides a memory access mechanism for the thread execution logic 1200 output processed data to memory for processing on a graphics processor output pipeline. In some embodiments, the data port 1214 includes or couples to one or more cache memories (e.g., data cache 1212) to cache data for memory access via the data port.

Figure 13:
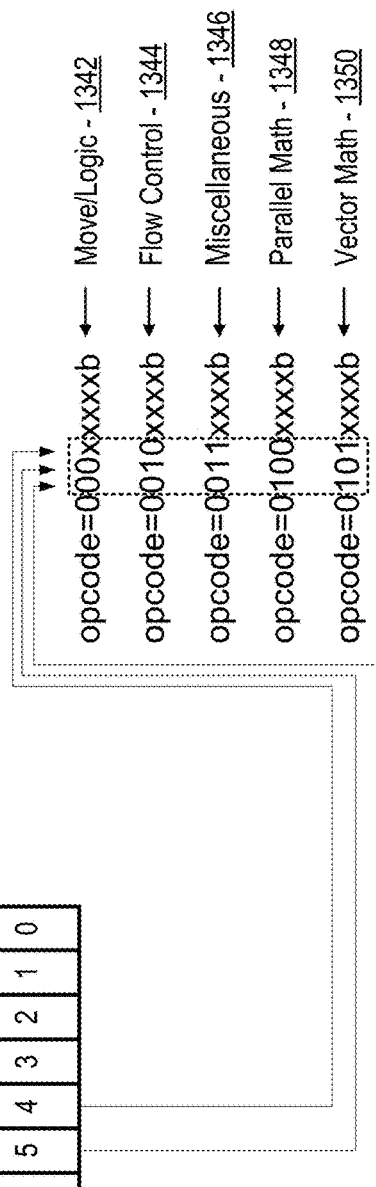
FIG. 13 illustrates graphics core instruction formats, according to some embodiments.

FIG. 13 is a block diagram illustrating a graphics processor instruction formats 1300 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 1300 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 1310. A 64-bit compacted instruction format 1330 is available for some instructions based on the selected instruction, instruction options, and number of operands. The native 128-bit format 1310 provides access to all instruction options, while some options and operations are restricted in the 64-bit format 1330. The native instructions available in the 64-bit format 1330 vary by embodiment. In some embodiments, the instruction is compacted in part using a set of index values in an index field 1313. The execution unit hardware references a set of compaction tables based on the index values and uses the compaction table outputs to reconstruct a native instruction in the 128-bit format 1310.

For each format, instruction opcode 1312 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 1314 enables control over certain execution options, such as channels selection (e.g., predication) and data channel order (e.g., swizzle). For 128-bit instructions 1310 an exec-size field 1316 limits the number of data channels that will be executed in parallel. In some embodiments, exec-size field 1316 is not available for use in the 64-bit compact instruction format 1330.

Some execution unit instructions have up to three operands including two source operands, src0 1322, src1 1322, and one destination 1318. In some embodiments, the execution units support dual destination instructions, where one of the destinations is implied. Data manipulation instructions can have a third source operand (e.g., SRC2 1324), where the instruction opcode 1312 determines the number of source operands. An instruction's last source operand can be an immediate (e.g., hard-coded) value passed with the instruction.

In some embodiments, the 128-bit instruction format 1310 includes an access/address mode information 1326 specifying, for example, whether direct register addressing mode or indirect register addressing mode is used. When direct register addressing mode is used, the register address of one or more operands is directly provided by bits in the instruction 1310.

In some embodiments, the 128-bit instruction format 1310 includes an access/address mode field 1326, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 1310 may use byte-aligned addressing for source and destination operands and when in a second mode, the instruction 1310 may use 16-byte-aligned addressing for all source and destination operands.

In one embodiment, the address mode portion of the access/address mode field 1326 determines whether the instruction is to use direct or indirect addressing. When direct register addressing mode is used bits in the instruction 1310 directly provide the register address of one or more operands. When indirect register addressing mode is used, the register address of one or more operands may be computed based on an address register value and an address immediate field in the instruction.

In some embodiments instructions are grouped based on opcode 1312 bit-fields to simplify Opcode decode 1340. For an 8-bit opcode, bits 10, 11, and 12 allow the execution unit to determine the type of opcode. The precise opcode grouping shown is merely an example. In some embodiments, a move and logic opcode group 1342 includes data movement and logic instructions (e.g., move (mov), compare (cmp)). In some embodiments, move and logic group 1342 shares the five most significant bits (MSB), where move (mov) instructions are in the form of 0000xxxxb and logic instructions are in the form of 0001xxxxb. A flow control instruction group 1344 (e.g., call, jump (jmp)) includes instructions in the form of 0010xxxxb (e.g., 0x20). A miscellaneous instruction group 1346 includes a mix of instructions, including synchronization instructions (e.g., wait, send) in the form of 0011xxxxb (e.g., 0x30). A parallel math instruction group 1348 includes component-wise arithmetic instructions (e.g., add, multiply (mul)) in the form of 0100xxxxb (e.g., 0x40). The parallel math group 1348 performs the arithmetic operations in parallel across data channels. The vector math group 1350 includes arithmetic instructions (e.g., dp4) in the form of 0101xxxxb (e.g., 0x50). The vector math group performs arithmetic such as dot product calculations on vector operands.

Figure 14:
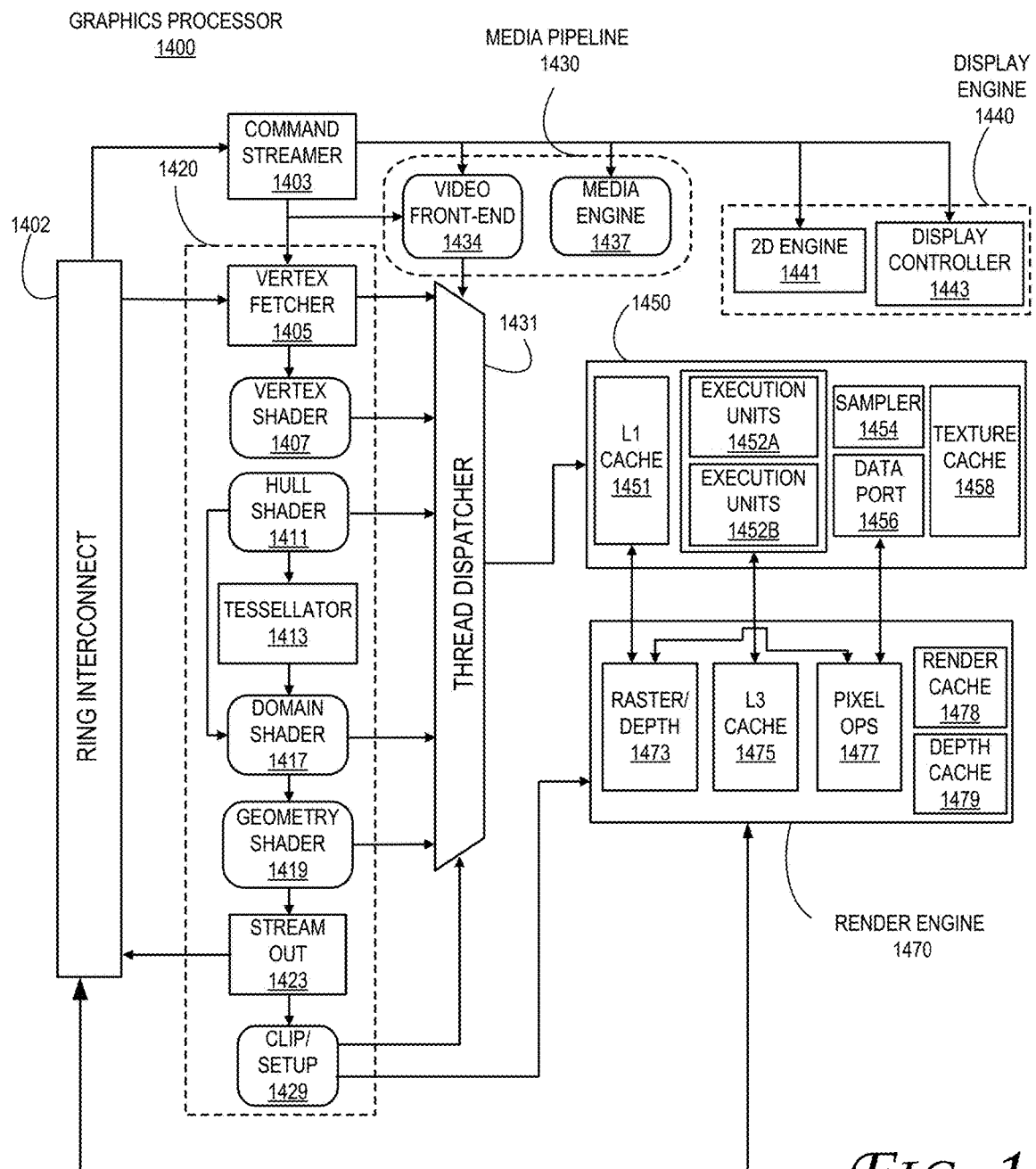

FIG. 14 is a block diagram of another embodiment of a graphics processor 1400. Elements of FIG. 14 having the same reference numbers (or names) as the elements of any other figure herein can operate or function in any manner similar to that described elsewhere herein, but are not limited to such.

In some embodiments, graphics processor 1400 includes a graphics pipeline 1420, a media pipeline 1430, a display engine 1440, thread execution logic 1450, and a render output pipeline 1470. In some embodiments, graphics processor 1400 is a graphics processor within a multi-core processing system that includes one or more general purpose processing cores. The graphics processor is controlled by register writes to one or more control registers (not shown) or via commands issued to graphics processor 1400 via a ring interconnect 1402. In some embodiments, ring interconnect 1402 couples graphics processor 1400 to other processing components, such as other graphics processors or general-purpose processors. Commands from ring interconnect 1402 are interpreted by a command streamer 1403, which supplies instructions to individual components of graphics pipeline 1420 or media pipeline 1430.

In some embodiments, command streamer 1403 directs the operation of a vertex fetcher 1405 that reads vertex data from memory and executes vertex-processing commands provided by command streamer 1403. In some embodiments, vertex fetcher 1405 provides vertex data to a vertex shader 1407, which performs coordinate space transformation and lighting operations to each vertex. In some embodiments, vertex fetcher 1405 and vertex shader 1407 execute vertex-processing instructions by dispatching execution threads to execution units 1452A, 1452B via a thread dispatcher 1431.

In some embodiments, execution units 1452A, 1452B are an array of vector processors having an instruction set for performing graphics and media operations. In some embodiments, execution units 1452A, 1452B have an attached L1 cache 1451 that is specific for each array or shared between the arrays. The cache can be configured as a data cache, an instruction cache, or a single cache that is partitioned to contain data and instructions in different partitions.

In some embodiments, graphics pipeline 1420 includes tessellation components to perform hardware-accelerated tessellation of 3D objects. In some embodiments, a programmable hull shader 1411 configures the tessellation operations. A programmable domain shader 1417 provides back-end evaluation of tessellation output. A tessellator 1413 operates at the direction of hull shader 1411 and contains special purpose logic to generate a set of detailed geometric objects based on a coarse geometric model that is provided as input to graphics pipeline 1420. In some embodiments, if tessellation is not used, tessellation components 1411, 1413, 1417 can be bypassed.

In some embodiments, complete geometric objects can be processed by a geometry shader 1419 via one or more threads dispatched to execution units 1452A, 1452B, or can proceed directly to the clipper 1429. In some embodiments, the geometry shader operates on entire geometric objects, rather than vertices or patches of vertices as in previous stages of the graphics pipeline. If the tessellation is disabled the geometry shader 1419 receives input from the vertex shader 1407. In some embodiments, geometry shader 1419 is programmable by a geometry shader program to perform geometry tessellation if the tessellation units are disabled.

Before rasterization, a clipper 1429 processes vertex data. The clipper 1429 may be a fixed function clipper or a programmable clipper having clipping and geometry shader functions. In some embodiments, a rasterizer/depth 1473 in the render output pipeline 1470 dispatches pixel shaders to convert the geometric objects into their per pixel representations. In some embodiments, pixel shader logic is included in thread execution logic 1450. In some embodiments, an application can bypass the rasterizer 1473 and access un-rasterized vertex data via a stream out unit 1423.

The graphics processor 1400 has an interconnect bus, interconnect fabric, or some other interconnect mechanism that allows data and message passing amongst the major components of the processor. In some embodiments, execution units 1452A, 1452B and associated cache(s) 1451, texture and media sampler 1454, and texture/sampler cache 1458 interconnect via a data port 1456 to perform memory access and communicate with render output pipeline components of the processor. In some embodiments, sampler 1454, caches 1451, 1458 and execution units 1452A, 1452B each have separate memory access paths.

In some embodiments, render output pipeline 1470 contains a rasterizer and depth test component 1473 that converts vertex-based objects into an associated pixel-based representation. In some embodiments, the rasterizer logic includes a windower/masker unit to perform fixed function triangle and line rasterization. An associated render cache 1478 and depth cache 1479 are also available in some embodiments. A pixel operations component 1477 performs pixel-based operations on the data, though in some instances, pixel operations associated with 2D operations (e.g. bit block image transfers with blending) are performed by the 2D engine 1441, or substituted at display time by the display controller 1443 using overlay display planes. In some embodiments, a shared L3 cache 1475 is available to all graphics components, allowing the sharing of data without the use of main system memory.

In some embodiments, graphics processor media pipeline 1430 includes a media engine 1437 and a video front end 1434. In some embodiments, video front end 1434 receives pipeline commands from the command streamer 1403. In some embodiments, media pipeline 1430 includes a separate command streamer. In some embodiments, video front-end 1434 processes media commands before sending the command to the media engine 1437. In some embodiments, media engine 1437 includes thread spawning functionality to spawn threads for dispatch to thread execution logic 1450 via thread dispatcher 1431.

In some embodiments, graphics processor 1400 includes a display engine 1440. In some embodiments, display engine 1440 is external to processor 1400 and couples with the graphics processor via the ring interconnect 1402, or some other interconnect bus or fabric. In some embodiments, display engine 1440 includes a 2D engine 1441 and a display controller 1443. In some embodiments, display engine 1440 contains special purpose logic capable of operating independently of the 3D pipeline. In some embodiments, display controller 1443 couples with a display device (not shown), which may be a system integrated display device, as in a laptop computer, or an external display device attached via a display device connector.

In some embodiments, graphics pipeline 1420 and media pipeline 1430 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

FIG. 15A is a block diagram illustrating a graphics processor command format 1500 according to some embodiments. FIG. 15B is a block diagram illustrating a graphics processor command sequence 1510 according to an embodiment. The solid lined boxes in FIG. 15A illustrate the components that are generally included in a graphics command while the dashed lines include components that are optional or that are only included in a sub-set of the graphics commands. The exemplary graphics processor command format 1500 of FIG. 15A includes data fields to identify a target client 1502 of the command, a command operation code (opcode) 1504, and the relevant data 1506 for the command. A sub-opcode 1505 and a command size 1508 are also included in some commands.

In some embodiments, client 1502 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 1504 and, if present, sub-opcode 1505 to determine the operation to perform. The client unit performs the command using information in data field 1506. For some commands an explicit command size 1508 is expected to specify the size of the command. In some embodiments, the command parser automatically determines the size of at least some of the commands based on the command opcode. In some embodiments commands are aligned via multiples of a double word.

The flow diagram in FIG. 15B shows an exemplary graphics processor command sequence 1510. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 1510 may begin with a pipeline flush command 1512 to cause any active graphics pipeline to complete the currently pending commands for the pipeline. In some embodiments, the 3D pipeline 1522 and the media pipeline 1524 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 1512 can be used for pipeline synchronization or before placing the graphics processor into a low power state.

In some embodiments, a pipeline select command 1513 is used when a command sequence requires the graphics processor to explicitly switch between pipelines. In some embodiments, a pipeline select command 1513 is required only once within an execution context before issuing pipeline commands unless the context is to issue commands for both pipelines. In some embodiments, a pipeline flush command is 1512 is required immediately before a pipeline switch via the pipeline select command 1513.

In some embodiments, a pipeline control command 1514 configures a graphics pipeline for operation and is used to program the 3D pipeline 1522 and the media pipeline 1524. In some embodiments, pipeline control command 1514 configures the pipeline state for the active pipeline. In one embodiment, the pipeline control command 1514 is used for pipeline synchronization and to clear data from one or more cache memories within the active pipeline before processing a batch of commands.

In some embodiments, return buffer state commands 1516 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 1516 includes selecting the size and number of return buffers to use for a set of pipeline operations.

The remaining commands in the command sequence differ based on the active pipeline for operations. Based on a pipeline determination 1520, the command sequence is tailored to the 3D pipeline 1522 beginning with the 3D pipeline state 1530, or the media pipeline 1524 beginning at the media pipeline state 1540.

The commands for the 3D pipeline state 1530 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 1530 commands are also able to selectively disable or bypass certain pipeline elements if those elements will not be used.

In some embodiments, 3D primitive 1532 command is used to submit 3D primitives to be processed by the 3D pipeline. Commands and associated parameters that are passed to the graphics processor via the 3D primitive 1532 command are forwarded to the vertex fetch function in the graphics pipeline. The vertex fetch function uses the 3D primitive 1532 command data to generate vertex data structures. The vertex data structures are stored in one or more return buffers. In some embodiments, 3D primitive 1532 command is used to perform vertex operations on 3D primitives via vertex shaders. To process vertex shaders, 3D pipeline 1522 dispatches shader execution threads to graphics processor execution units.

In some embodiments, 3D pipeline 1522 is triggered via an execute 1534 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 1510 follows the media pipeline 1524 path when performing media operations. In general, the specific use and manner of programming for the media pipeline 1524 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 1524 is configured in a similar manner as the 3D pipeline 1522. A set of media pipeline state commands 1540 are dispatched or placed into in a command queue before the media object commands 1542. In some embodiments, media pipeline state commands 1540 include data to configure the media pipeline elements that will be used to process the media objects. This includes data to configure the video decode and video encode logic within the media pipeline, such as encode or decode format. In some embodiments, media pipeline state commands 1540 also support the use one or more pointers to "indirect" state elements that contain a batch of state settings.

In some embodiments, media object commands 1542 supply pointers to media objects for processing by the media pipeline. The media objects include memory buffers containing video data to be processed. In some embodiments, all media pipeline states must be valid before issuing a media object command 1542. Once the pipeline state is configured and media object commands 1542 are queued, the media pipeline 1524 is triggered via an execute command 1544 or an equivalent execute event (e.g., register write). Output from media pipeline 1524 may then be post processed by operations provided by the 3D pipeline 1522 or the media pipeline 1524. In some embodiments, GPGPU operations are configured and executed in a similar manner as media operations.

Figure 16:
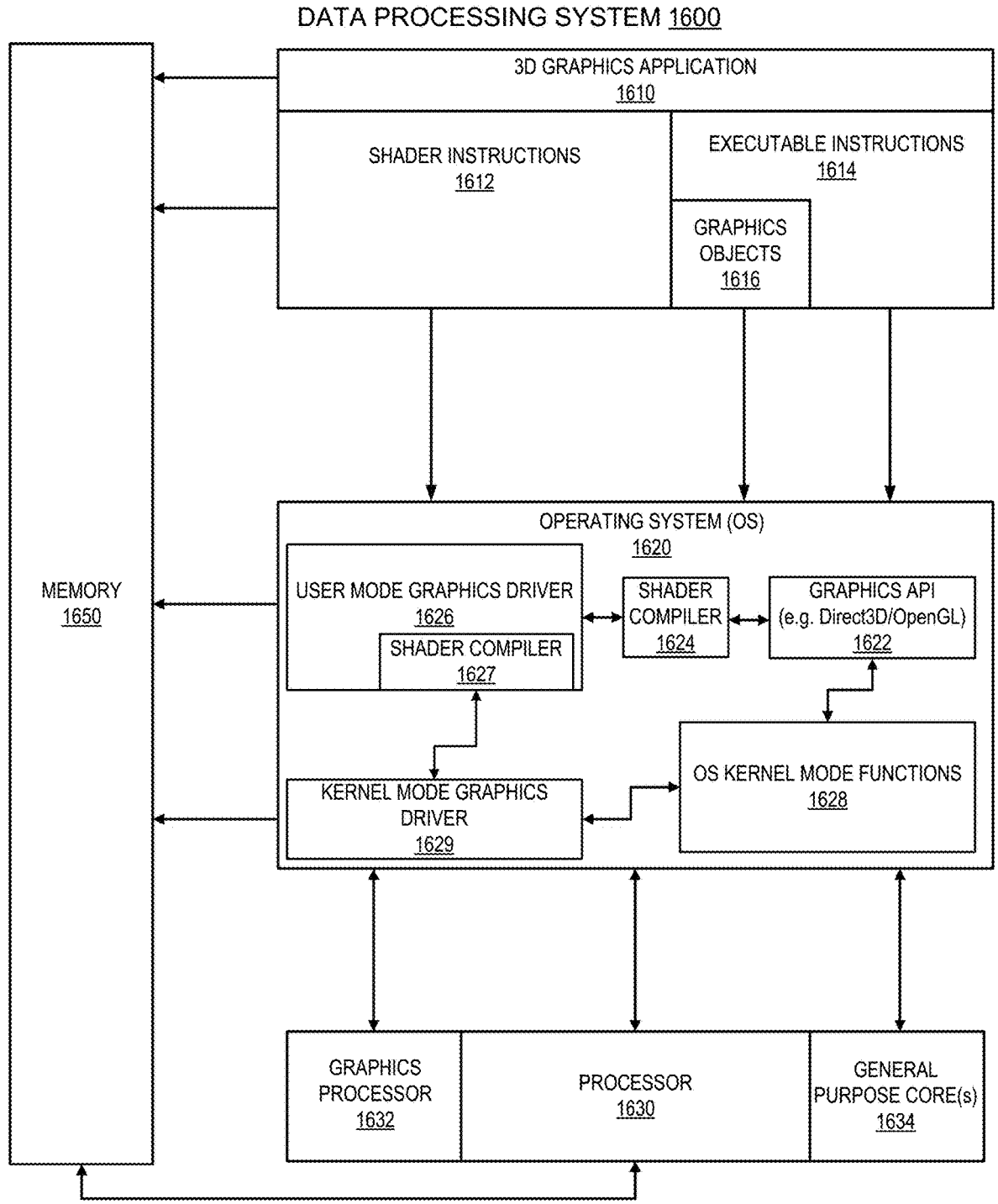

FIG. 16 illustrates exemplary graphics software architecture for a data processing system 1600 according to some embodiments. In some embodiments, software architecture includes a 3D graphics application 1610, an operating system 1620, and at least one processor 1630. In some embodiments, processor 1630 includes a graphics processor 1632 and one or more general-purpose processor core(s) 1634. The graphics application 1610 and operating system 1620 each execute in the system memory 1650 of the data processing system.

In some embodiments, 3D graphics application 1610 contains one or more shader programs including shader instructions 1612. The shader language instructions may be in a high-level shader language, such as the High Level Shader Language (HLSL) or the OpenGL Shader Language (GLSL). The application also includes executable instructions 1614 in a machine language suitable for execution by the general-purpose processor core 1634. The application also includes graphics objects 1616 defined by vertex data.

In some embodiments, operating system 1620 is a Microsoft® Windows® operating system from the Microsoft Corporation, a proprietary UNIX-like operating system, or an open source UNIX-like operating system using a variant of the Linux kernel. When the Direct3D API is in use, the operating system 1620 uses a front-end shader compiler 1624 to compile any shader instructions 1612 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1610.

In some embodiments, user mode graphics driver 1626 contains a back-end shader compiler 1627 to convert the shader instructions 1612 into a hardware specific representation. When the OpenGL API is in use, shader instructions 1612 in the GLSL high-level language are passed to a user mode graphics driver 1626 for compilation. In some embodiments, user mode graphics driver 1626 uses operating system kernel mode functions 1628 to communicate with a kernel mode graphics driver 1629. In some embodiments, kernel mode graphics driver 1629 communicates with graphics processor 1632 to dispatch commands and instructions.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 17:
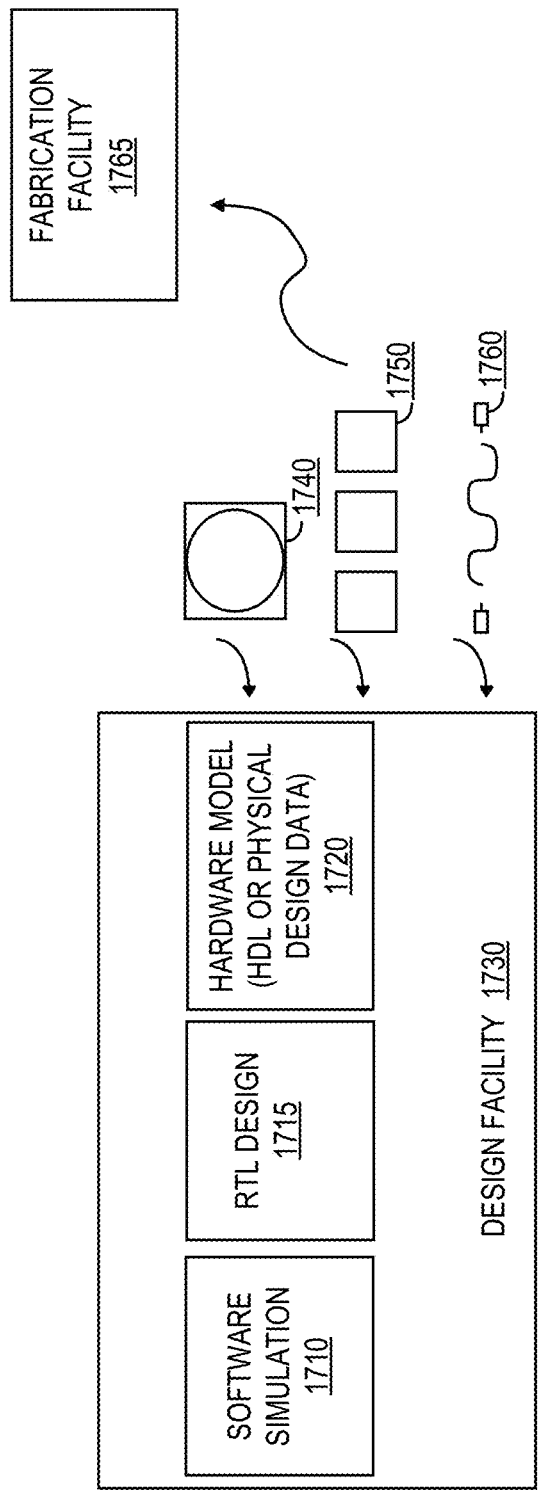
FIG. 17 illustrates a diagram of IP core development according to an embodiment.

FIG. 17 is a block diagram illustrating an IP core development system 1700 that may be used to manufacture an integrated circuit to perform operations according to an embodiment. The IP core development system 1700 may be used to generate modular, re-usable designs that can be incorporated into a larger design or used to construct an entire integrated circuit (e.g., an SOC integrated circuit). A design facility 1730 can generate a software simulation 1710 of an IP core design in a high level programming language (e.g., C/C++). The software simulation 1710 can be used to design, test, and verify the behavior of the IP core. A register transfer level (RTL) design can then be created or synthesized from the simulation model 1700. The RTL design 1715 is an abstraction of the behavior of the integrated circuit that models the flow of digital signals between hardware registers, including the associated logic performed using the modeled digital signals. In addition to an RTL design 1715, lower-level designs at the logic level or transistor level may also be created, designed, or synthesized. Thus, the particular details of the initial design and simulation may vary.

The RTL design 1715 or equivalent may be further synthesized by the design facility into a hardware model 1720, which may be in a hardware description language (HDL), or some other representation of physical design data. The HDL may be further simulated or tested to verify the IP core design. The IP core design can be stored for delivery to a 3rd party fabrication facility 1765 using non-volatile memory 1740 (e.g., hard disk, flash memory, or any non-volatile storage medium). Alternatively, the IP core design may be transmitted (e.g., via the Internet) over a wired connection 1750 or wireless connection 1760. The fabrication facility 1765 may then fabricate an integrated circuit that is based at least in part on the IP core design. The fabricated integrated circuit can be configured to perform operations in accordance with at least one embodiment described herein.

Figure 18:
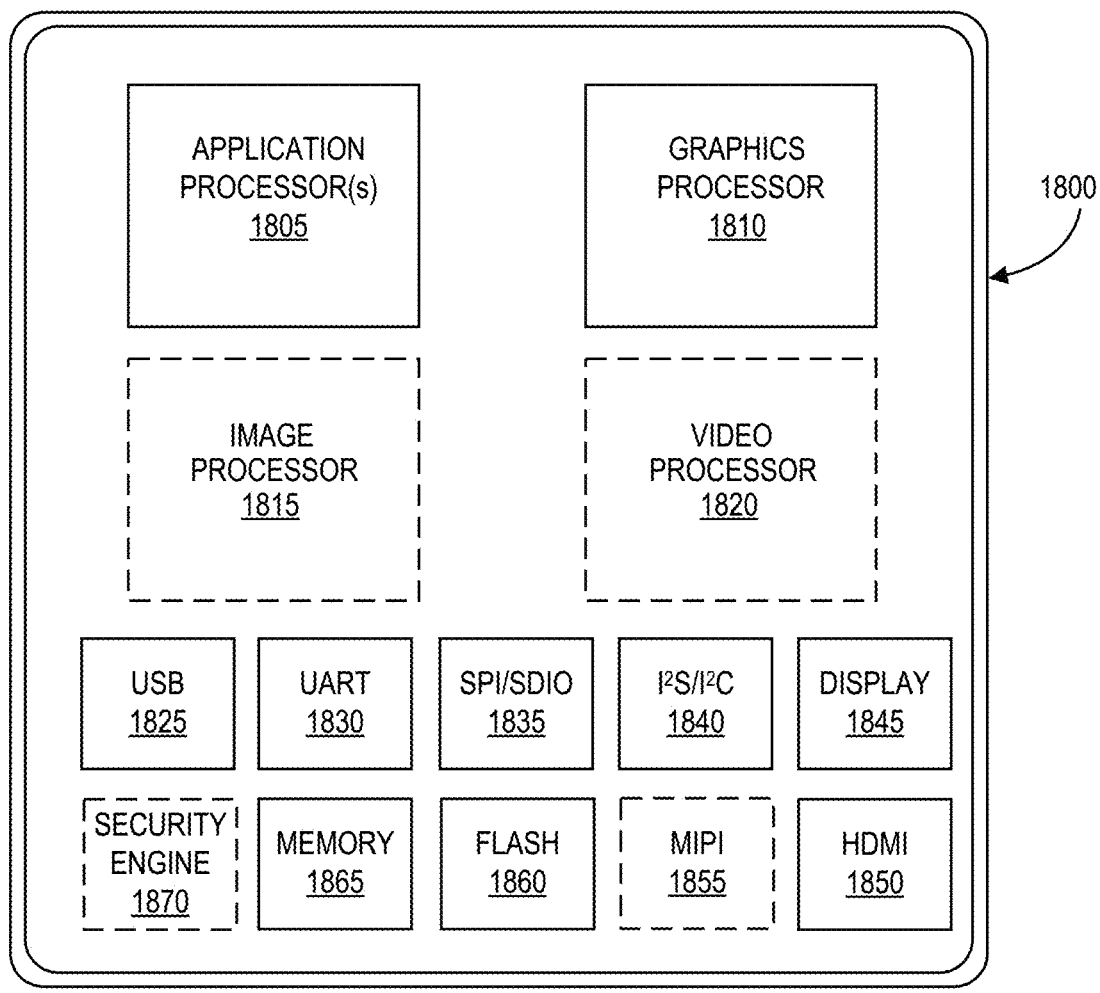

FIG. 18 is a block diagram illustrating an exemplary system on a chip integrated circuit 1800 that may be fabricated using one or more IP cores, according to an embodiment. The exemplary integrated circuit includes one or more application processors 1805 (e.g., CPUs), at least one graphics processor 1810, and may additionally include an image processor 1815 and/or a video processor 1820, any of which may be a modular IP core from the same or multiple different design facilities. The integrated circuit includes peripheral or bus logic including a USB controller 1825, UART controller 1830, an SPI/SDIO controller 1835, and an I2S/I2C controller 1840. Additionally, the integrated circuit can include a display device 1845 coupled to one or more of a high-definition multimedia interface (HDMI) controller 1850 and a mobile industry processor interface (MIPI) display interface 1855. Storage may be provided by a flash memory subsystem 1860 including flash memory and a flash memory controller. Memory interface may be provided via a memory controller 1865 for access to SDRAM or SRAM memory devices. Some integrated circuits additionally include an embedded security engine 1870.

Additionally, other logic and circuits may be included in the processor of integrated circuit 1800, including additional graphics processors/cores, peripheral interface controllers, or general purpose processor cores.

The following examples pertain to further embodiments. Example 1 includes an apparatus comprising: logic to compile: a first version of a code to access one or more registers as shared local memory; and a second version of the code to access a cache as the shared local memory; and logic to execute the first version of the code in response to comparison of a work group size of the code with a threshold value. Example 2 includes the apparatus of example 1, wherein the threshold value is a maximum work group size for the code or a frequently used work group size. Example 3 includes the apparatus of example 1, wherein the work group size corresponds to a number of one or more related work items in the code. Example 4 includes the apparatus of example 1, comprising logic to execute the second version of the code in response to an indication that the work group size of the code is larger than the threshold value. Example 5 includes the apparatus of example 1, wherein the logic to compile is to generate the first version of the code and the second version of the code prior to runtime. Example 6 includes the apparatus of example 1, wherein the logic to execute is to execute the first version of the code in response to an indication that the work group size of the code is less than the threshold value. Example 7 includes the apparatus of example 1, wherein access to the one or more registers or access to the cache is to comprise a read operation or a write operation. Example 8 includes the apparatus of example 1, wherein a register file is to comprise the one or more registers. Example 9 includes the apparatus of example 1, wherein a Graphics Processing Unit (GPU) is to comprise the logic to compile or the logic to execute. Example 10 includes the apparatus of example 9, wherein the GPU is to comprise the shared local memory. Example 11 includes the apparatus of example 9, wherein the GPU is to comprise one or more graphics processing cores. Example 12 includes the apparatus of example 1, wherein a Central Processing Unit (CPU) is to comprise the logic to compile or the logic to execute. Example 13 includes the apparatus of example 12, wherein the CPU is to comprise the shared local memory. Example 14 includes the apparatus of example 12, wherein the CPU is to comprise one or more processor cores. Example 15 includes the apparatus of example 1, wherein one or more of the logic to compile, the logic to execute, or the shared local memory are on a single integrated circuit die.

Example 16 includes a system comprising: a processor coupled to a shared local memory, the processor to comprise: logic to compile: a first version of a code to access one or more registers as shared local memory; and a second version of the code to access a cache as the shared local memory; and logic to execute the first version of the code in response to comparison of a work group size of the code with a threshold value. Example 17 includes the system of example 16, wherein the threshold value is a maximum work group size for the code or a frequently used work group size. Example 18 includes the system of example 16, wherein the work group size corresponds to a number of one or more related work items in the code. Example 19 includes the system of example 16, comprising logic to execute the second version of the code in response to an indication that the work group size of the code is larger than the threshold value. Example 20 includes the system of example 16, wherein the logic to execute is to execute the first version of the code in response to an indication that the work group size of the code is less than the threshold value.

Example 21 includes a method comprising: compiling a first version of a code to access one or more registers as shared local memory; compiling a second version of the code to access a cache as the shared local memory; and executing the first version of the code in response to comparison of a work group size of the code with a threshold value. Example 22 includes the method of example 21, wherein the threshold value is a maximum work group size for the code or a frequently used work group size. Example 23 includes the method of example 21, wherein the work group size corresponds to a number of one or more related work items in the code. Example 24 includes the method of example 21, further comprising executing the second version of the code in response to an indication that the work group size of the code is larger than the threshold value. Example 25 includes the method of example 21, further comprising executing the first version of the code in response to an indication that the work group size of the code is less than the threshold value.

Example 26 includes a computer-readable medium comprising one or more instructions that when executed on a processor configure the processor to perform one or more operations to: compile a first version of a code to access one or more registers as shared local memory; compile a second version of the code to access a cache as the shared local memory; and execute the first version of the code in response to comparison of a work group size of the code with a threshold value. Example 27 includes the computer-readable medium of example 26, wherein the threshold value is a maximum work group size for the code or a frequently used work group size. Example 28 includes the computer-readable medium of example 26, wherein the work group size corresponds to a number of one or more related work items in the code. Example 29 includes the computer-readable medium of example 26, further comprising one or more instructions that when executed on the at least one processor configure the at least one processor to perform one or more operations to execute the second version of the code in response to an indication that the work group size of the code is larger than the threshold value. Example 30 includes the computer-readable medium of example 26, further comprising one or more instructions that when executed on the at least one processor configure the at least one processor to perform one or more operations to cause to execute the first version of the code in response to an indication that the work group size of the code is less than the threshold value.

Example 31 includes an apparatus comprising means to perform a method as set forth in any preceding example. Example 32 comprises machine-readable storage including machine-readable instructions, when executed, to implement a method or realize an apparatus as set forth in any preceding example.

In various embodiments, the operations discussed herein, e.g., with reference to FIGS. 1-18, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-18.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic circuitry to compile:
      a first version of a code to access one or more registers as shared local memory; and
      a second version of the code to access a cache as the shared local memory, wherein the logic circuitry to compile is to compile both the first version of the code and the second version of the code prior to execution of either of the first version of the code or the second version of the code; and
   logic circuitry to execute the first version of the code in response to a determination that a work group size of the first version of the code is below a threshold value, wherein the threshold value is a frequently used work group size, wherein the second version of the code comprises a universal binary code to be compiled in accordance with a maximum work group size prior to execution of either of the first version of the code or the second version of the code.

2. The apparatus of claim 1, wherein the threshold value is a maximum work group size for the code.

3. The apparatus of claim 1, wherein the work group size corresponds to a number of one or more related work items in the code.

4. The apparatus of claim 1, comprising logic circuitry to execute the second version of the code in response to an indication that the work group size of the code is above the threshold value.

5. The apparatus of claim 1, wherein the logic circuitry to compile is to generate the first version of the code and the second version of the code prior to runtime.

6. The apparatus of claim 1, wherein the logic circuitry to execute is to execute the first version of the code in response to an indication that the work group size of the code is less than the threshold value.

7. The apparatus of claim 1, wherein access to the one or more registers or access to the cache is to comprise a read operation or a write operation.

8. The apparatus of claim 1, wherein a register file is to comprise the one or more registers.

9. The apparatus of claim 1, wherein a Graphics Processing Unit (GPU) is to comprise the logic circuitry to compile or the logic circuitry to execute.

10. The apparatus of claim 9, wherein the GPU is to comprise the shared local memory.

11. The apparatus of claim 9, wherein the GPU is to comprise one or more graphics processing cores.

12. The apparatus of claim 1, wherein a Central Processing Unit (CPU) is to comprise the logic circuitry to compile or the logic circuitry to execute.

13. The apparatus of claim 12, wherein the CPU is to comprise the shared local memory.

14. The apparatus of claim 12, wherein the CPU is to comprise one or more processor cores.

15. The apparatus of claim 1, wherein one or more of the logic circuitry to compile, the logic circuitry to execute, or the shared local memory are on a single integrated circuit die.

16. A system comprising:
   a processor coupled to a shared local memory, the processor to comprise:
      logic circuitry to compile:
         a first version of a code to access one or more registers as shared local memory; and
         a second version of the code to access a cache as the shared local memory, wherein the logic circuitry to compile is to compile both the first version of the code and the second version of the code prior to execution of either of the first version of the code or the second version of the code; and
      logic circuitry to execute the first version of the code in response a determination that a work group size of the first version of the code is below a threshold value, wherein the threshold value is a frequently used work group size, wherein the second version of the code comprises a universal binary code to be compiled in accordance with a maximum work group size prior to execution of either of the first version of the code or the second version of the code.

17. The system of claim 16, wherein the threshold value is a maximum work group size for the code.

18. The system of claim 16, wherein the work group size corresponds to a number of one or more related work items in the code.

19. A method comprising:
   compiling a first version of a code to access one or more registers as shared local memory;
   compiling a second version of the code to access a cache as the shared local memory, wherein both the first version of the code and the second version of the code are compiled prior to execution of either of the first version of the code or the second version of the code; and
   executing the first version of the code in response a determination that a work group size of the first version of the code is below a threshold value, wherein the threshold value is a frequently used work group size, wherein the second version of the code comprises a universal binary code that is compiled in accordance with a maximum work group size prior to execution of either of the first version of the code or the second version of the code.

20. The method of claim 19, wherein the threshold value is a maximum work group size for the code.

21. The method of claim 19, wherein the work group size corresponds to a number of one or more related work items in the code.

22. A non-transitory computer-readable medium comprising one or more instructions that when executed on a processor configure the processor to perform one or more operations to:
   compile a first version of a code to access one or more registers as shared local memory;
   compile a second version of the code to access a cache as the shared local memory, wherein both the first version of the code and the second version of the code are to be compiled prior to execution of either of the first version of the code or the second version of the code; and
   execute the first version of the code in response a determination that a work group size of the first version of the code is below a threshold value, wherein the threshold value is a frequently used work group size, wherein the second version of the code comprises a universal binary code to be compiled in accordance with a maximum work group size prior to execution of either of the first version of the code or the second version of the code.

23. The non-transitory computer-readable medium of claim 22, wherein the threshold value is a maximum work group size for the code.

24. The non-transitory computer-readable medium of claim 22, wherein the work group size corresponds to a number of one or more related work items in the code.

25. The non-transitory computer-readable medium of claim 22, further comprising one or more instructions that when executed on the at least one processor configure the at least one processor to perform one or more operations to execute the second version of the code in response to an indication that the work group size of the code is above the threshold value.

\* \* \* \* \*